US011838370B1

(12) United States Patent
Dasher

(10) Patent No.: US 11,838,370 B1
(45) Date of Patent: Dec. 5, 2023

(54) SYSTEMS AND METHODS FOR ENABLING COMMUNICATIONS IN AN EXTENDED REALITY ENVIRONMENT

(71) Applicant: ROVI GUIDES, INC., San Jose, CA (US)

(72) Inventor: Charles Dasher, Lawrenceville, GA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/970,171

(22) Filed: Oct. 20, 2022

(51) Int. Cl.
  *H04L 67/131* (2022.01)
  *H04L 67/50* (2022.01)
  *H04L 67/52* (2022.01)
  *H04L 67/1396* (2022.01)

(52) U.S. Cl.
  CPC ........ *H04L 67/131* (2022.05); *H04L 67/1396* (2022.05); *H04L 67/52* (2022.05); *H04L 67/535* (2022.05)

(58) Field of Classification Search
  CPC ... H04L 67/131; H04L 67/1396; H04L 67/52; H04L 67/535
  See application file for complete search history.

(56) References Cited

U.S. PATENT DOCUMENTS

| | | | | |
|---|---|---|---|---|
| 11,546,437 B1 * | 1/2023 | Bhushan | .................. | H04L 67/12 |
| 11,563,813 B1 * | 1/2023 | Bhushan | ................ | G06F 16/213 |
| 11,676,345 B1 * | 6/2023 | Bhushan | ................. | G06T 11/00 705/7.27 |
| 2014/0067915 A1 * | 3/2014 | Choi | ....................... | H04L 67/08 709/203 |
| 2020/0057592 A1 * | 2/2020 | Boyapalle | .............. | G09G 3/003 |
| 2022/0130103 A1 * | 4/2022 | Peuhkurinen | ........... | G06T 15/20 |

(Continued)

FOREIGN PATENT DOCUMENTS

| | | | | |
|---|---|---|---|---|
| WO | WO-2021062278 A1 * | 4/2021 | ............. | G06F 3/011 |
| WO | WO-2021256584 A1 * | 12/2021 | | |

OTHER PUBLICATIONS

Expert Electronics, Pileup, Pileupdx.com (https://pileupdx.com/product-category/brands/expert-electronics/), version of Jul. 3, 2022 accessed via The Wayback Machine (5 pages).

(Continued)

*Primary Examiner* — Oanh Duong
(74) *Attorney, Agent, or Firm* — HALEY GUILIANO LLP

(57) ABSTRACT

Systems and methods are described herein for generating for display, at an extended reality (XR) device executing an application, an XR environment comprising an entity and associated with an XR session of a user profile. Execution of the application enables the XR device, while generating for display the XR environment, to transmit data to, and receive data from, a particular device using a first communication protocol, and transmit data to, and receive data from, the entity using a second communication protocol. Based on monitored activity of the user profile during the XR session, the XR device may be enabled to transmit data, received at the XR device from the entity using the second communication protocol, to the particular device using the first communication protocol, and transmit data, received at the XR device from the particular device using the first communication protocol, to the entity using the second communication protocol.

20 Claims, 13 Drawing Sheets

(56) References Cited

U.S. PATENT DOCUMENTS

2023/0040884 A1* 2/2023 Zavesky .............. H04N 21/816
2023/0089307 A1* 3/2023 King ..................... G06V 20/20
                                                        345/633

OTHER PUBLICATIONS

Software-defined radio, Wikipedia (https://en.wikipedia.org/wiki/Software-defined_radio); version of Jul. 3, 2022 accessed via The Wayback Machine (12 pages).
Using WebSDR Shortwave receiver at Twente Netherlands on the Internet—Bing video (https://www.bing.com/videos/search?q=sdrweb&docid=608026722122745479&mid=E8C2B0B3932E53CF002DE8C2B0B3932E53CF002D&view=detail&FORM=VIRE) (1 page) (Feb. 5, 2015).

* cited by examiner

SYSTEMS AND METHODS FOR ENABLING COMMUNICATIONS IN AN EXTENDED REALITY ENVIRONMENT

BACKGROUND

This disclosure is directed to systems and methods for enabling communications in an extended reality (XR) environment. In particular, techniques are disclosed for, based on monitoring activity associated with a user profile during an XR session associated with an XR device, enabling communications between a particular device and an entity of the XR environment via the XR device.

SUMMARY

Many devices employ radio frequency (RF)-based communication protocols, such as Wi-Fi®, Bluetooth®, Zigbee®, Sidewalk®, etc., which generally rely on special-purpose hardware modules (e.g., a Wi-Fi module or a Bluetooth module) capable of modulating electromagnetic waves to carry information. Such information may be broadcast to other devices or transmitted to a base station, such as a Wi-Fi access point (AP), acting as a transceiver. Often, in order to utilize such RF-based communication protocols, credentials or other information is received and validated, and/or other manual configuration is performed by a user.

However, there are at least some instances in which ad hoc communication between devices (e.g., utilizing RF-based protocols over a transmission medium, such as air) may be desirable. For example, it may be desirable to implement ad hoc communication without regard to whether a device has pre-existing hardware (e.g., a dedicated Wi-Fi module for transmitting and receiving Wi-Fi signals), whether pre-existing security information (e.g., login information) is known, and without having to perform extensive manual configuration of the device. While software-defined radios (SDR) have been employed, in which tasks performed by specialized hardware (e.g., mixers, filters, modulators, demodulators, etc.) can be performed by a general-purpose processor, current approaches for configuring an SDR device are cumbersome for typical users. For example, the configuring of such an SDR device may require deep understanding of technology from within multi-discipline domains (i.e., software development, systems administration, RF engineering, network engineering, etc.).

In addition, in current approaches, it is challenging to enable communications between devices located outside of typical transmit and receive ranges of certain RF-based communication protocols. For example, current approaches fail to adequately enable a first device (e.g., being operated by a service technician) located remote from a second device (e.g., in a user's home or in an industrial facility) to configure the second device (e.g., a home appliance), such as when the second device is not connected to the Internet. For example, to perform the configuring of the second device, short-range communication protocols or proprietary communication protocols may need to be utilized, which the first device may not be able to implement given the first device's distance from the second device.

To help address these issues, computer-implemented systems and methods are provided herein for generating for display, at an extended reality (XR) device executing an application (e.g., an application implementing SDR, as part of an SDR system, in the XR device) an XR environment. The XR environment may comprise an entity (e.g., a home appliance in a user's home or industrial equipment in a company's warehouse), and the XR environment may be associated with an XR session of a user profile. The executing of the application may enable the XR device, while generating for display the XR environment, to transmit data to, and receive data from, a particular device using a first communication protocol of a plurality of communication protocols, and transmit data to, and receive data from, the entity using a second communication protocol of the plurality of communication protocols. Based on monitoring activity associated with the user profile during the XR session, the provided systems and methods may enable the XR device to transmit data, received at the XR device from the entity using the second communication protocol, to the particular device using the first communication protocol, and transmit data, received at the XR device from the particular device using the first communication protocol, to the entity using the second communication protocol.

Such aspects enable an XR device in an XR environment to act as a transceiver and/or a bridge or a proxy with respect to an entity (e.g., within the XR environment and/or in a same physical environment as the XR device) and a particular device (e.g., located remote from the XR environment and/or in a same physical environment as the XR device, such as, for example, a service technician associated with the entity). In some embodiments, the provided systems and methods may enable an XR computing device (e.g., implementing an SDR and capable of processing digital signals) or other radio transmission device (RTD) (e.g., a device capable of acting as a Wi-Fi hotspot, ad hoc or infrastructure device) to be configured to establish bespoke communications between a plurality of devices located both within and outside of the XR environment and a normal transmit or receive range of an RF signal transmitted or received by the XR device or RTD.

In some embodiments, the provided systems and methods may enable an XR device to facilitate the creation of or create a data network or to act as a proxy to an existing data network, to enable an at least one secondary device (e.g., a physical device or a virtual device) to communicate with devices within the created network. In some embodiments, the provided systems and methods may enable the creation of local ad hoc networks (e.g., Wi-Fi, Bluetooth, Sidelink, Sidewalk, Zigbee or proprietary RF-based communications, or any other suitable network) using a communication protocol from among the plurality of communication protocols, by way of the SDR system. Such networks may be configured locally or remotely. Such communication networks and protocols may be implemented without the need for protocol specific hardware, and may enable "on the fly" creation of a communication network for other XR devices (or other devices) within or external to the XR environment, to join in to share a connection or to share in a private XR experience.

In some aspects of this disclosure, monitoring the activity associated with the user profile during the XR session comprises determining that the XR device is proximate to the entity in the XR environment. In some embodiments, such determination that the XR device is proximate to the entity in the XR environment is performed while the XR device is transmitting data to, or receiving data from, the particular device using the first communication protocol.

In some embodiments, the XR environment is a virtual reality (VR) environment associated with a physical environment in which the XR device is located, and the entity generated for display in the VR environment is a virtual object corresponding to a real-world object in the physical environment. In some embodiments, determining that the XR device is proximate to the entity in the XR environment may comprise determining that a virtual representation associated with the XR device is proximate to the virtual object.

In some aspects of this disclosure, the XR environment is an augmented reality (AR) environment associated with a physical environment in which the XR device is located, and the entity generated for display in the AR environment corresponds to a real-world object in the physical environment. In some embodiments, determining that the XR device is proximate to the entity in the XR environment may comprise determining that the XR device is proximate to the real-world object.

In some embodiments, determining that the XR device is proximate to the real-world object is based on performing processing of images of the real-world object captured by the XR device.

In some aspects of this disclosure, the systems and methods further comprise generating for display in the VR environment a first virtual representation associated with the user profile, and a second virtual representation associated with the particular device. The provided systems and methods may monitor the activity associated with the user profile during the XR session by determining that the first virtual representation is proximate to the second virtual representation.

In some embodiments, the systems and methods further comprise generating for display, in the XR environment, a notification regarding whether the particular device should be granted permission to transmit data to, and receive data from, the entity via the XR device. In some embodiments, the determining to enable the XR device to facilitate communications between the entity and the particular device comprises receiving an affirmative selection, from the user profile, to grant permission to the particular device to transmit data to, and receive data from, the entity via the XR device.

In some aspects of this disclosure, the systems and methods further comprise generating for display indications of the plurality of communication protocols, receiving selection of one of the indications, and creating an ad hoc network based on a communication protocol corresponding to the selected indication.

In some embodiments, the entity corresponds to a real-world object in a physical environment corresponding to the XR environment, and the particular device is associated with a manufacturer of the object and is located remote from the physical environment comprising the object. In some embodiments, the data, received at the XR device from the entity using the second communication protocol and transmitted to the particular device using the first communication protocol, is diagnostic data associated with the entity. In some embodiments, the data, received at the XR device from the particular device using the first communication protocol and transmitted to the entity using the second communication protocol, is used to configure the entity based on the diagnostic data.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
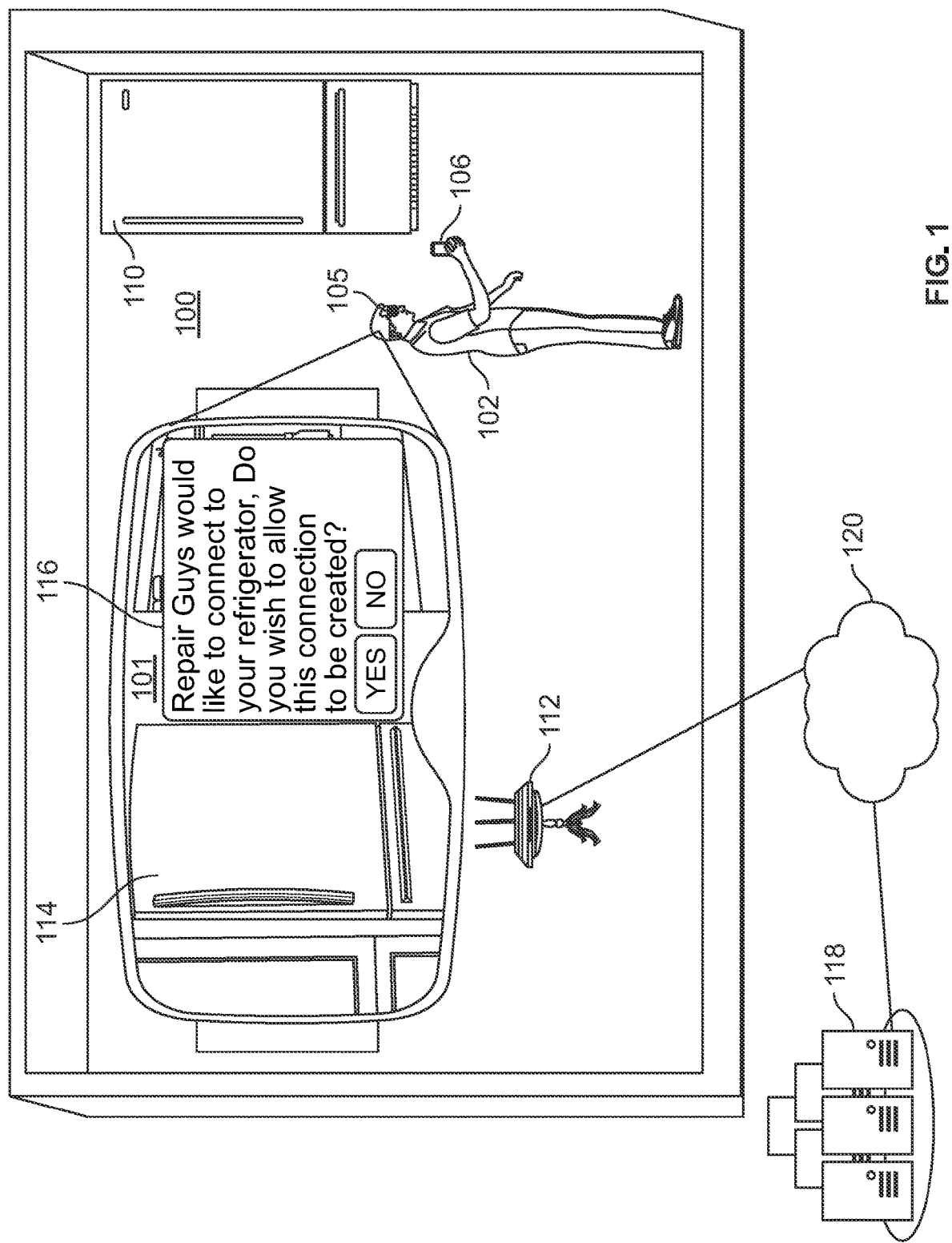
FIG. 1 shows an illustrative environment in which communications in an XR environment may be enabled, in accordance with some embodiments of this disclosure.

FIG. 1 shows an illustrative environment in which communications in an XR environment may be enabled, in accordance with some embodiments of this disclosure. Environment 100 may be a particular physical location (e.g., a household of user 102, a park or playground, a place of business, an industrial facility, a school, other organization, or any other suitable location, or any combination thereof). Environment 100 may comprise any suitable number and types of entities (e.g., persons, animals, objects, particular users or types thereof, or any other suitable observable entity or attribute thereof, or any combination thereof). For example, environment 100 may be a household of user 102 comprising refrigerator 110 and networking equipment 112. As shown in FIG. 1, networking equipment 112 may facilitate a connection to network 120 (e.g., the Internet) and computing device 118.

Figure 3:
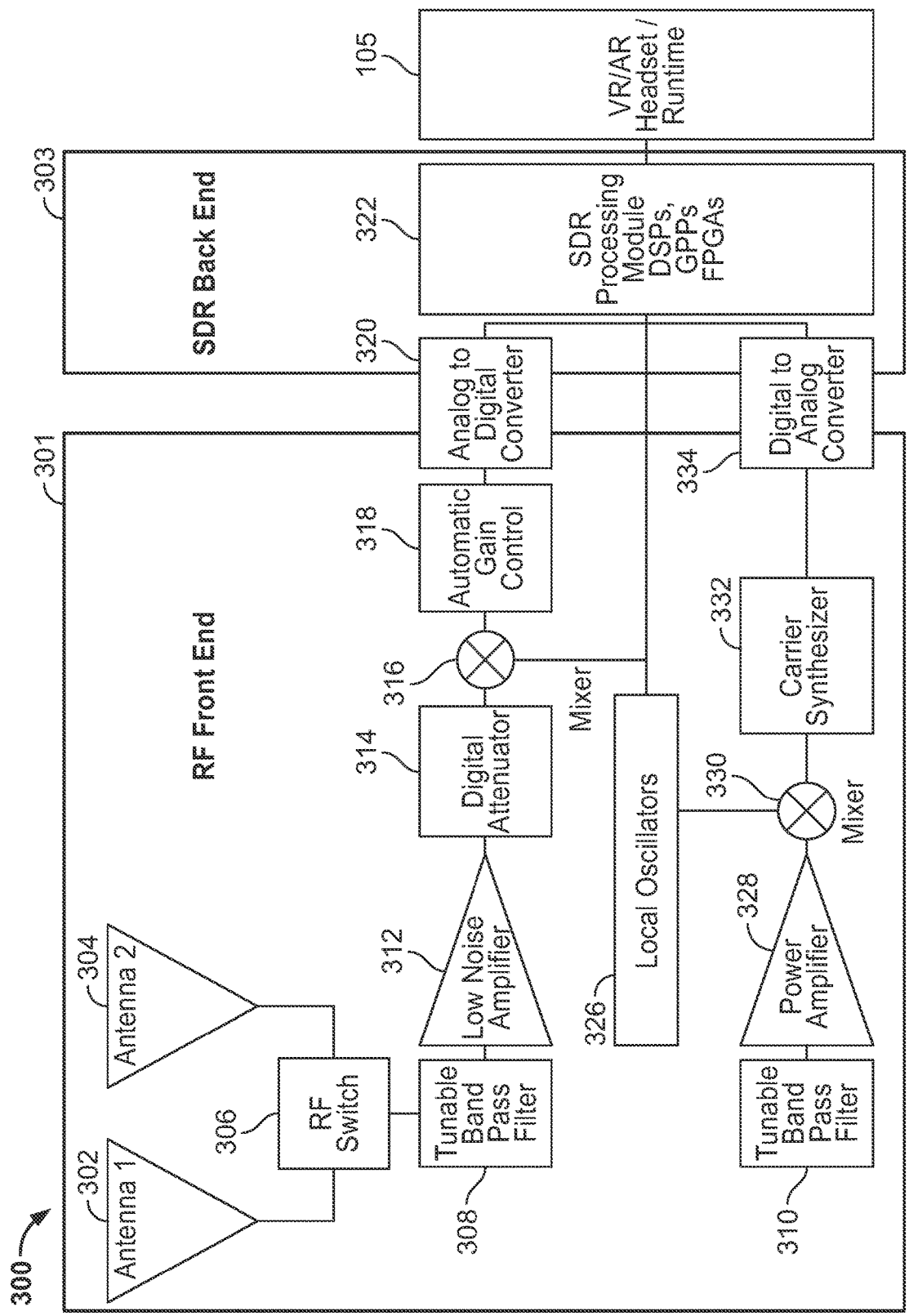
FIG. 3 shows an illustrative block diagram for incorporating an SDR application in an XR device, in accordance with some embodiments of this disclosure.

In some embodiments, a software-defined radio (SDR) system may be implemented comprising an SDR application configured to enable communications between one or more devices within environment 100 and/or external to environment 100, and may comprise an extended reality (XR)

application configured to provide an XR environment for users to experience and interact with. In some embodiments, the XR application may be considered separate from, or part of, the SDR application, and/or may be implemented at least in part at a same XR device as the SDR application. The SDR application may comprise any suitable combination of hardware and/or software modules that may be executable to perform tasks to facilitate radio frequency (RF)-based communication (e.g., via a radio wave) or facilitate communication via a light wave or via any other suitable signal or protocol. In some embodiments, the SDR application may perform tasks (such as, for example, modulation, demodulation, mixing, etc., traditionally performed by separate specialized hardware components) using one or more programmable digital components, to enable communications across any suitable range of radio frequencies. For example, the SDR application may enable communications using different communication protocols based on executing different portions of modifiable software or firmware, e.g., to provide for reconfigurable and flexible radio communications. FIG. 3, as discussed in more detail below, depicts an illustrative configuration that may be implemented in connection with the SDR system.

Figure 12:
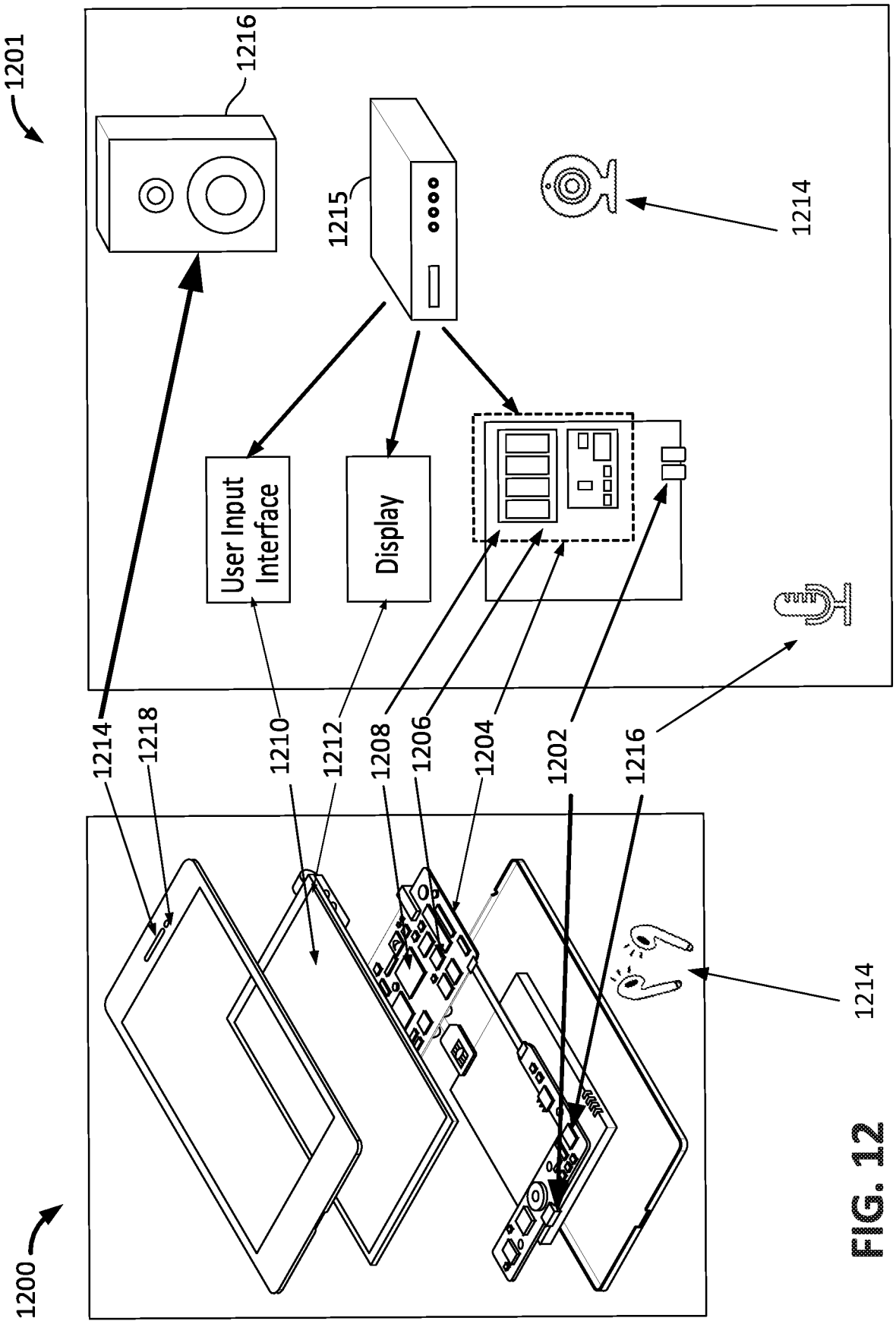
FIG. 12 shows illustrative XR devices, in accordance with some embodiments of this disclosure.
Figure 13:
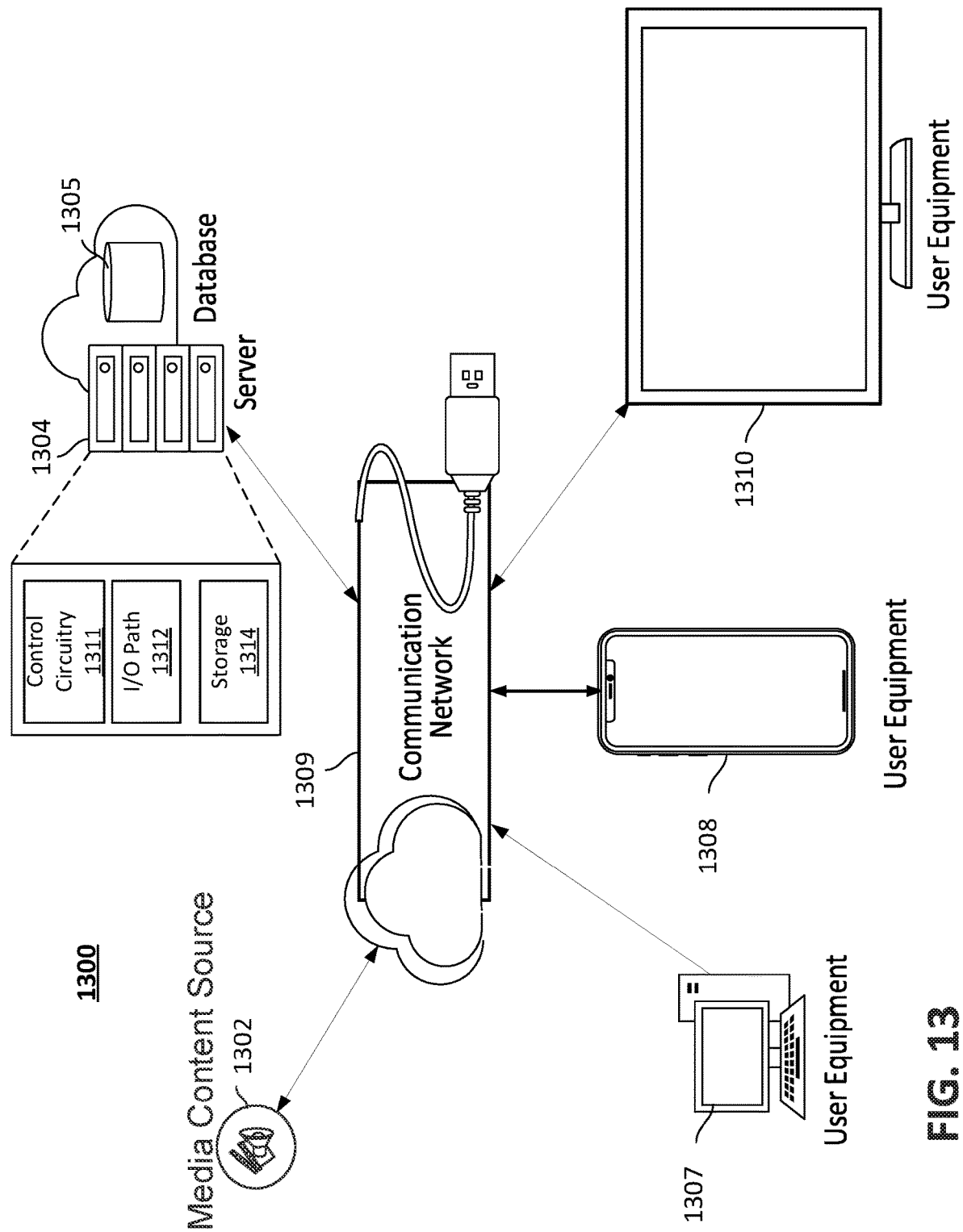
FIG. 13 shows illustrative systems, in accordance with some embodiments of this disclosure.

In some embodiments, the SDR system may be implemented at least in part at one or more of server 1304 of FIG. 13, user device 1200, 1201 of FIG. 12, user device 1307, 1308, 1310 of FIG. 13, networking equipment 112 of FIG. 1, refrigerator 110 of FIG. 1, computing device 118 of FIG. 1, or distributed across one or more of any other suitable devices, or any combination thereof. For example, the SDR system may comprise an application running at least in part on an extended reality (XR) device, such as, for example, a mobile device 106, a smart watch or wearable device, smart glasses 105, a wearable camera, a smartphone, a tablet, augmented reality (AR) glasses, AR head-mounted display (HMD), virtual reality (VR) HMD, VR glasses, or any other suitable XR device, or any combination thereof. In some embodiments, the SDR system may include functionality of, or otherwise be implemented at the same device as, one or more XR applications that run on smart phones or near-eye displays.

In some embodiments, environment 100 may be associated with XR environment 101. XR may be understood as comprising virtual reality (VR), augmented reality (AR) or mixed reality (MR) technologies or any suitable combination thereof. VR systems may project images to generate a three-dimensional environment to fully immerse (e.g., giving the user a sense of being in an environment) or partially immerse (e.g., giving the user the sense of looking at an environment) users in a three-dimensional, computer-generated environment. AR systems may provide a modified version of reality, such as enhanced or supplemental computer-generated images or information overlaid over real-world objects. MR systems may map interactive virtual objects to the real world, e.g., where virtual objects interact with the real world or the real world is otherwise connected to virtual objects. Each of such environments may include objects or items that the user can experience and interact with.

In some embodiments, the processes and techniques described above and below may be offered via an application programming interface (API) to developers. For example, software tools (e.g., one or more software development kits, or SDKs) may be provided to any suitable party, to enable the party to implement the functionality of enabling communications within and/or external to the XR environment, as discussed herein.

XR environment 101 may comprise representation 114 of refrigerator 110 of physical environment 100, and notification overlay 116. In some embodiments, environment 101 may correspond to an AR environment, and representation 114 may correspond to a depiction of real-world refrigerator 110, as captured by a camera of XR device 105 or 106 or other camera (e.g., a security camera), and such representation 114 may be displayed with AR content overlaid thereon or proximate thereto (e.g., notification overlay 116). In some embodiments, environment 101 may correspond to a VR environment, and representation 114 may correspond to a digital twin or virtual object corresponding to real-world refrigerator 110. In some embodiments, the VR environment may not correspond to a representation of physical environment 100 of user 102, but rather may correspond to a representation of any suitable location or place remote from user 102 or may correspond to a representation of a fictional environment (e.g., from a video game, book, movie, TV show or any other suitable fictional environment). XR environment 101 may comprise any suitable number and types of entities and/or objects. In some embodiments, other user(s) or entities may be participating in an XR session with user 102, and a representation (e.g., an avatar) of such other user(s) within environment 101 may be displayed, and/or a representation (e.g., avatar) of user 102 may be displayed. In some embodiments, generating for display XR environment 101 may correspond to generating for display a video or other imagery corresponding to XR environment 101 and/or or any other suitable content.

Figure 2:
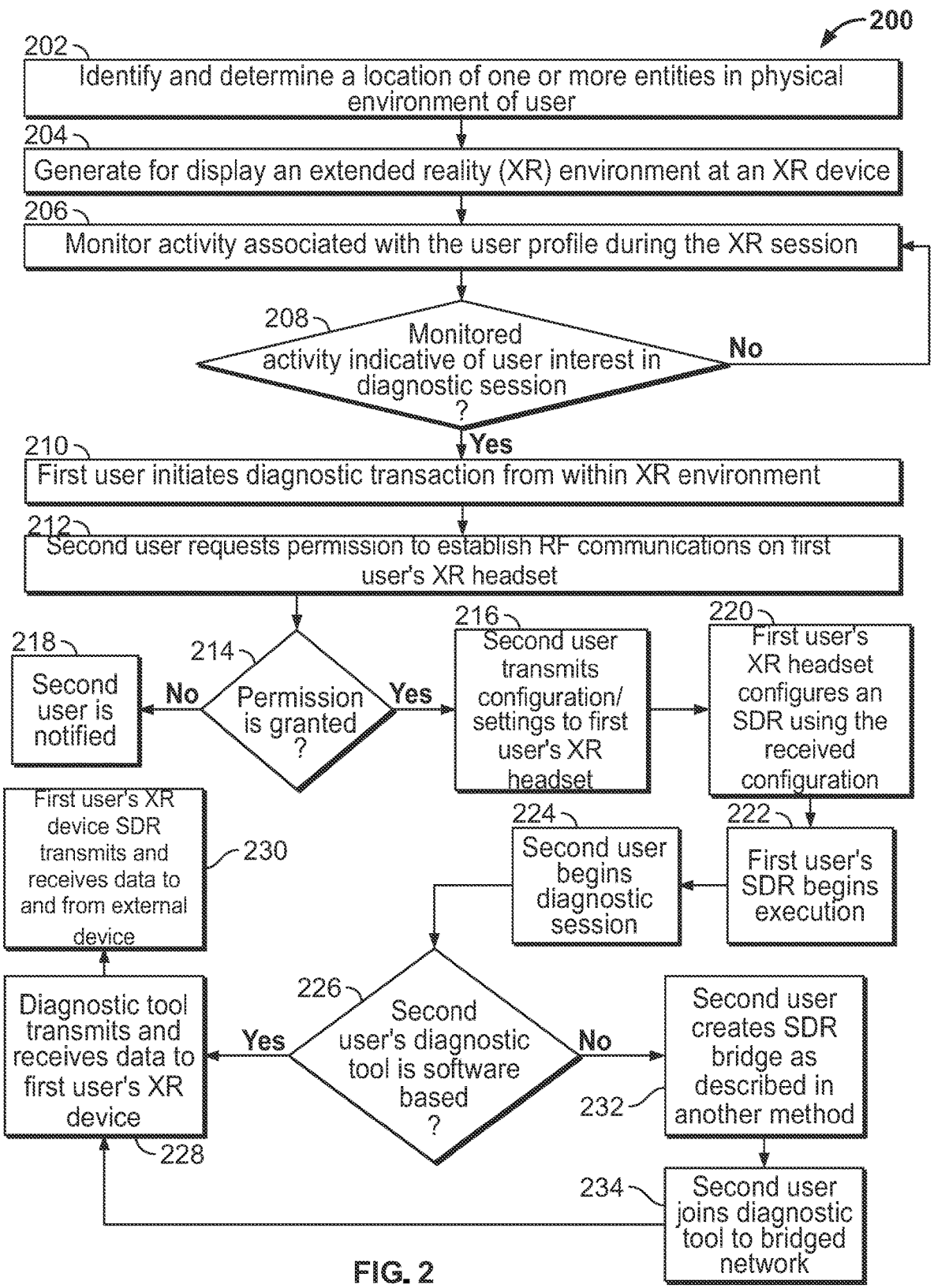
FIG. 2 is a flowchart of a detailed illustrative process for enabling communications in an XR environment, in accordance with some embodiments of this disclosure.

FIG. 2 is a flowchart of a detailed illustrative process 200 for enabling communications in an XR environment, in accordance with some embodiments of this disclosure. In various embodiments, the individual steps of process 200 may be implemented by one or more components of the devices and systems of FIGS. 1-13. Although the present disclosure may describe certain steps of process 200 (and of other processes described herein) as being implemented by certain components of the devices and systems of FIGS. 1-13, this is for purposes of illustration only, and it should be understood that other components of the devices and systems of FIGS. 1-13 may implement those steps instead.

At 202, the SDR system may identify and determine a location of one or more entities (e.g., refrigerator 110 and networking equipment 112) in a physical environment 100 of user 102. In some embodiments, the SDR system may be configured to utilize any suitable number and types of sensors to determine information related to the entities in environment 100 of FIG. 1. For example, XR device 105 may employ or be in communication with one or more of an image sensor, ultrasonic sensor, radar sensor, LED sensor, LIDAR sensor, or any other suitable sensor, or any combination thereof, to detect and classify entities (e.g., networking equipment 112 and/or refrigerator 110) in environment 100. In some embodiments, the SDR system may request user 102 to perform a walkthrough of environment 100 with XR device 105 or 106, to scan and enable the SDR system to map entities of environment 100 based on the captured sensor data. For example, the SDR system may instruct the user to point a camera and/or light source at various points in environment 100 to build a map of environment 100, e.g., a three-dimensional mapping. In some embodiments, one or more sensors of XR device 106 may be used to ascertain a location of an entity by outputting a light or radio wave signal, and measuring a time for a return signal to be detected and/or measuring an intensity of the returned signal, and/or performing image processing on images captured by the image sensor of environment 100. In some embodiments, input from user 102 may be received, identifying a location and/or classification or identity of a particular entity or object.

In some embodiments, one or more devices and/or one or more entities in environment 100 may be configured to communicate wirelessly. For example, refrigerator 110, or any other suitable entity, may be an Internet of Things (IoT) device equipped with sensors (e.g., a camera or image sensor, a microphone, or any other suitable sensors or any combination thereof) or other circuitry (e.g., wireless communication circuitry). In such example, refrigerator 110 may indicate to the SDR system a location and/or type of refrigerator 110 within environment 100. Refrigerator 110 may communicate with XR device 105 via the Internet or any other suitable protocol or network or directly, e.g., via short-range wireless communication or a wired connection. In some embodiments, one or more computing devices 118 external to environment 100 (e.g., a server, a user device, or other computing device or computing devices external to environment 100) may be associated with a manufacturer of, and/or service technician for, refrigerator 110. In some embodiments, XR device 105 may facilitate communications between refrigerator 110 and computing device 118 using any suitable type and number of communication protocol, e.g., the Internet, short-range communication protocols, proprietary communication protocols of the manufacturer, or any other suitable network or protocol or any combination thereof.

At 204, the SDR system may generate for display XR environment 101 at XR device 105 or 106. In some embodiments, XR environment 101 may be generated for display in response to a user request (e.g., received from a user account or user profile associated with user 102) to initiate an XR session at XR device 105 or 106. In some embodiments, entities may be identified in physical environment 100 during or in response to XR environment 101 being generated for display during the XR session. For example, one or more entities in a field of view of XR device 105 and/or 106 during the XR session (or at a time other than an XR session) may be identified, such as when environment 101 corresponds to an AR environment comprising depictions of real-world entities and augmented reality content. A field of view may be understood as a portion of an environment (real or virtual or any combination thereof) that is captured by a camera of a user device at a given time, and/or presented to the user at a given time by the user device (e.g., an angle in a 360-degree sphere environment). In some embodiments, the field of view may comprise a pair of 2D images to create a stereoscopic view in the case of a VR device. In the case of an AR device (e.g., smart glasses), the field of view may comprise 3D or 2D images, which may include a mix of real objects and virtual objects overlaid on top of the real objects using the AR device (e.g., for smart glasses, a picture captured with a camera and content added by the smart glasses). If an XR environment has a single degree of liberty, e.g., a rotation of 360 degrees, any field of view may be defined by either the edge angular coordinates (e.g., +135 degrees, +225 degrees) or by a single angular coordinate (e.g., −55 degrees) combined with the known angular opening of the field of view. If an XR environment has six degrees of liberty, say three rotations of 360 degrees and three spatial positions, any field of view may be defined by three angular coordinates and three spatial coordinates. A field of view may therefore be understood as a portion of an environment displayed when the user is at a particular location in the environment and has oriented the display device in a particular direction.

In the example of FIG. 1, the SDR system may identify refrigerator 110 and/or networking equipment 112 in a field of view of user 102 or XR device 105 or 106. In some embodiments, the SDR system may generate a data structure for a current field of view of the user, including entity identifiers associated with entities in environment 100. In some embodiments, such data structure may include coordinates representing the position of the field of view and entities in environment 100.

The SDR system may utilize any suitable number or types of image processing techniques (e.g., object recognition, pattern recognition, facial recognition, edge detection, computer vision, or any other suitable technique or any combination thereof) to identify entities depicted in images captured by a camera of XR device 105 or 106 or any other suitable camera. For example, one or more features for a particular object may be extracted and compared to features stored locally and/or at a database or server storing features of objects and corresponding classifications of objects. For example, if dimensions, shape, color, or any other suitable attribute, or any combination thereof, is extracted from one or more images of object 110, the SDR system may determine that object 110 corresponds to a refrigerator (and/or a particular type of refrigerator) based on similarity between the extracted and stored information. In some embodiments, a Cartesian coordinate plane may be used to identify a position of an entity in environment 100, with the position recorded as (x, y) coordinates on the plane. In some embodiments, the coordinates may include a coordinate in the z-axis, to identify the position of each identified object in 3D space, based on images captured using 3D sensors and any other suitable depth-sensing technology. In some embodiments, coordinates may be normalized to allow for comparison to coordinates stored at the database in association with corresponding objects. As an example, an origin of the coordinate system may be considered to be a corner of a room within or corresponding to environment 100, and the position of the entity may correspond to the coordinates of the center of other portion of the entity.

In some embodiments, the SDR system may utilize one or more machine learning models to localize and/or classify objects in environment 100. For example, the machine learning model may output a value, a vector, a range of values, any suitable numeric representation of classifications of objects, or any combination thereof. The machine learning model may output one or more classifications and associated confidence values, where the classifications may be any categories into which objects may be classified or characterized. Various machine learning models (e.g., naive Bayes algorithm, logistic regression, recurrent neural network, bi-directional long short-term memory recurrent neural network model (LSTM-RNN), or any other suitable model, or any combination thereof) may be used to classify objects. In some embodiments, the model may be trained on a plurality of labeled image pairs, where image data may be preprocessed and represented as feature vectors or another suitable numerical representation.

In some embodiments, the SDR system may be configured to maintain and store registered user accounts and/or profiles. For example, user 102 may be associated with a particular user account or profile, accessible via any number of XR devices or other devices at which the user provides his or her credentials, and from any number of different locations. The XR device 105 may monitor and store any suitable type of user information associated with user 102, and may reference the particular user profile or account to determine an identity of a human (e.g., user 102) in environment 100. The user profile or account may include user information input by the user, e.g., characteristics of the user, such as gender, age, height, weight, interests, or any other suitable user information, or any combination thereof, and/or user information gleaned from monitoring a condition of the user or other activities of the user, e.g., current and/or historical biometric data of the user, facial or voice characteristics of the user, historical actions or behaviors of the user, user interactions with websites or applications (e.g., social media, or any other suitable website or application, or any combination thereof) or purchase history, or any other suitable user information, or any combination thereof. In some embodiments, certain devices may be associated with a particular user device or user account, e.g., device identifiers for one or more of XR devices 105 or 106 may be stored in association with a user profile of user 102. In some embodiments, the SDR system may determine that a user profile or account associated with user 102 is logged in to XR device 105 or 106 and is participating in an XR session during which XR environment may be generated for display for user interaction therewith.

At 206, the SDR system may monitor activity associated with the user profile during the XR session. As an example, the SDR system may determine that, while the XR session is ongoing, XR device 105 or 106 (and thus user 102 using such device(s)) is in proximity to an entity (e.g., refrigerator 110), based on sensors of such XR device(s) or any other suitable sensors in environment 100. In some embodiments, the SDR system may determine a current location of user 102 within environment 100 based on any suitable technique, e.g., based on wireless signal characteristics of one or more of XR device 105 or refrigerator 110 or networking equipment 112; sensor data (e.g., captured images by one or more of the user devices or one or more cameras positioned at various locations in environment 100); audio signals captured by a microphone of a user device; an IoT device or home assistant indicating a location of a user; or any other suitable sensor data or any combination thereof. In some embodiments, the SDR system may determine that user 102 is in proximity to refrigerator 110 based on comparing the current location of user 102 to the stored location of each respective object. For example, user 102 may be considered in proximity to an object if the comparison indicates that the locations of XR device being used by user 102, and that of refrigerator 110, are the same or are within a threshold distance (e.g., five feet, or any other suitable distance). In some embodiments, the SDR system may track the movements of the user with, e.g., gyroscopes, accelerometers, cameras, etc., in combination with control circuitry. In some embodiments, the threshold for proximity may vary based on a type of entity, and/or may be set automatically or may be specified in the user profile for all entities or certain entities. In some embodiments, the SDR system may process images (or other sensor data) captured by or provided to the XR device to determine a distance between the XR device (and thus user 102) and refrigerator 110. In some embodiments, whether XR device 105 or 106 is proximate to a particular entity may be performed based on comparing coordinates extracted from a data structure associated with a current field of view of XR device 105 or 106.

In some embodiments, the SDR system may determine whether XR device 105 or 106 (or a virtual representation of a user of such device) is proximate to refrigerator 110 (or representation 114 in XR environment 101) at all times, or at certain times. For example, the proximity of user 102 to refrigerator 110 may be ascertained when user 102 is communicating with a service technician associated with computing device 118 external to environment 100, or is accessing information related to refrigerator 110, or inputs or utters a command related to refrigerator 110. In some embodiments, the threshold distance may correspond to a range of a communication protocol of refrigerator 110, e.g., a range of a Bluetooth communication or a range of a proprietary communication protocol used by refrigerator 110 to communicate with, e.g., XR device 105 or another computing device.

In some embodiments, such as when XR environment 101 corresponds to a VR environment, the SDR system may determine that XR device 105 is proximate to an entity (e.g., refrigerator 110) based on determining that a virtual representation associated with XR device 105 (e.g., an avatar for the user profile of user 102 or an avatar for XR device 105) is, within the VR environment, proximate to a virtual representation (e.g., 114) of refrigerator 110. For example, a virtual distance or focal length between such virtual representation of user 102 and the virtual representation of refrigerator 110 may be, for example, the perceived distance the object in the XR environment is located from the user's avatar, and may be calculated based on comparing the coordinates of each virtual object in the XR environment.

In some embodiments, such as when XR environment 101 corresponds to a VR environment, the SDR system may monitor activity associated with the user profile during the XR session by determining that a virtual representation associated with XR device 105 (e.g., an avatar for the user profile of user 102 or an avatar for XR device 105) is, within the VR environment, proximate to a virtual representation of computing device 118. For example, the SDR system may determine that an avatar of user 102 within environment 101 is visiting a virtual repair shop in XR environment 101 associated with a manufacturer of refrigerator 110 and computing device 118. For example, a virtual distance or focal length between such virtual representation of user 102 and the virtual representation associated with computing device 118 (e.g., the manufacture of refrigerator 110) may be, for example, the perceived distance the object in the XR environment is located from the user's avatar, and may be calculated based on comparing the coordinates of each virtual object in the XR environment.

At 208, the SDR system may determine whether the monitored activity indicates that the user has interest in enabling communications (e.g., for engaging in a diagnostic session) with computing device 118, with respect to an entity (e.g., refrigerator 110). For example, if user 102 (or a virtual representation thereof) and/or XR device 105 (or a virtual representation thereof) is proximate to refrigerator 110, e.g., is within the threshold distance of representation 114 of a virtual twin of refrigerator 110 (e.g., in a VR environment) or a depiction of an optionally augmented real-world refrigerator 110 (e.g., in an AR environment), or is within the threshold distance of a virtual representation (e.g., a virtual repair shop) associated with computing device 118, processing may proceed to 210. In some embodiments, an affirmative determination at 208 may additionally or alternatively take into account whether XR device 105 is currently communicating (e.g., over network 120) with computing device 118, e.g., receiving data from computing device 118 or transmitting data to computing device 118. For example, a user of XR device 105 may be messaging or in voice communication with a service technician associated with computing device 118, and such service technician may ask user 102 to move towards refrigerator 110 (in environment 100 or 101) to initiate a diagnostic session. Processing may return to 206 in the event of a negative determination at 208.

At 210, the SDR system may determine that a first user (e.g., user 102) using an XR device (e.g., XR device 105) has initiated a diagnostic transaction, such as, for example, in association with refrigerator 110, from within XR environment 101. For example, while XR environment 101 is being generated for display at XR device 105 and/or 106, the SDR system may enable transmission of data to, and receipt of data from, computing device 118 via a first communication protocol. The first communication protocol may be a Wi-Fi network, provided via networking equipment 112 in communication with network 120 (e.g., the Internet), a cellular network, a satellite network, a telephone network, and/or any other suitable network, of multiple communication protocols enabled by the SDR system. Using such first communication protocol, XR device 105 may be in communication with an automated diagnostic service or human service technician (e.g., employed by a manufacturer of refrigerator 110) using or associated with computing device 118 external to environment 100. For example, user 102 may cause his or her virtual representation to visit a virtual repair shop within an XR environment 101 to request and/or pay for a diagnostic service for refrigerator 110, which may be malfunctioning. While this example shows refrigerator 110, the techniques described herein may be employed in connection with other devices in other environments, such as, for example, industrial equipment in an industrial facility. For example, it may be desirable for such equipment not to be connected to the Internet, or such equipment may not be capable of being connected to the Internet, and such techniques may nonetheless enable remote configuration of such equipment.

In some embodiments, the SDR system may not permit user 102 to initiate such a diagnostic session in XR environment 101 without user 102 and/or XR device 105 being proximate to refrigerator 110. In some embodiments, the SDR system may initiate the diagnostic transaction based on a request received via an app or website associated with computing device 118 and/or a manufacturer or technician associated with refrigerator 110. In some embodiments, such digital twin of refrigerator 110 may be positioned in the VR environment at a location corresponding to its real-world location in environment 100. For example, XR device 105 may detect that user 102 is moving towards refrigerator 110 in a physical environment and/or within the XR environment.

In some embodiments, XR device 105 and/or 106, networking equipment 112 (e.g., a router, a modem, a switch, an access point, or any other suitable device or any combination thereof), and/or any suitable IoT device (e.g., refrigerator 110 or any entity), or any other suitable device or object or any combination thereof, may be equipped with antennas. Such antennas may be used for transmitting and receiving electromagnetic signals at frequencies within the electromagnetic spectrum, e.g., radio frequencies, to communicate with each other over a network in a localized area. The network may correspond to, e.g., a Wi-Fi network, such as, for example, 802.11n, 802.11ac, 802.11ax, or Wi-Gig/802.11ad, or any other suitable network, or any combination thereof. The devices or objects of environment 100 may communicate wirelessly over a wireless local area network (WLAN) and with the Internet, and may be present within an effective coverage area of the localized network, e.g., a home network or enterprise network. The Internet may include a global system of interconnected computer networks and devices employing common communication protocols, e.g., the transmission control protocol (TCP), user datagram protocol (UDP) and the internet protocol (IP) in the TCP/IP internet protocol suite. In some embodiments of this disclosure, the entities and devices of environment 100 may communicate via a short-range wired or wireless communication technique (e.g., Bluetooth, RFID, NFC, or any other suitable technique, or any combination thereof). In some embodiments, the SDR system executing at XR device 105 and/or 106 may enable communications with other devices (e.g., refrigerator 110 and/or computing device 118) using one or more of a plurality of communication protocols, even if dedicated hardware for such communication protocol is not implemented at the XR device. The SDR system may enable the XR device to be configured to communicate with other devices over RF-based protocols such as, for example, Wi-Fi, Bluetooth, Bluetooth low energy (BLE), Zigbee, Sidewalk, near-field communication (NFC), IP-based protocols, non-IP based protocols, or any other suitable communication protocols, or any combination thereof. In some embodiments, such communication using multiple communication protocols, as enabled by the SDR system, may be performed regardless of whether dedicated hardware modules for certain communication protocols are included in the XR device.

At 212, a second user, such as, for example, an automated diagnostic service or human technician (e.g., employed by a manufacturer or technician of refrigerator 110) associated with computing device 118 external to environment 100, may request permission to establish communications, e.g., RF-based communications, with refrigerator 110 by way of XR device 105 or 106. As shown in FIG. 1, XR device 105 or 106 may generate for display notification overlay prompting user 102 to decide whether to grant permission to the diagnostic service to be permitted to transmit data to, and receive data from, refrigerator 110, e.g., via XR device 105. In some embodiments, notification overlay 116 may be generated for display in response to determining that XR device 105 (and thus user 102) is proximate to refrigerator 110, e.g., within a threshold distance from refrigerator 110.

At 214, the SDR system may determine whether permission has been granted, e.g., whether selection of "Yes" or "No" with respect to notification overlay 116 has been received. Selection input may be received in any suitable form, e.g., biometric input, voice input, touch input, gaze input, or any other suitable input, or any combination thereof. If an affirmative selection of "Yes" is received, processing may proceed to 216 to enable a remote diagnostic operation; otherwise processing may proceed to 218, and computing device 118 may be notified (e.g., via network 120) of the user's negative selection. In some embodiments, environment 101 corresponds to an AR environment, and notification overlay 116 may be (e.g., from the perspective of the user looking through smart glasses) generated for presentation to be overlaid on, or otherwise inserted proximate to, representation 114 of refrigerator 110, to enhance representation 114 or an area proximate thereto with AR effect. In some embodiments, environment 101 corresponds to an VR environment, and notification overlay 116 may be (e.g., from the perspective of the user looking through smart glasses) generated for presentation to be overlaid on, or inserted proximate to, a virtual object corresponding to representation 114 of refrigerator 110.

At 216, the second user, e.g., an automated diagnostic service or human technician (e.g., employed by a manufacturer of refrigerator 110) associated with computing device 118 external to environment 100 may transmit configuration information and/or settings and/or parameters to XR device 105 or 106 of user 102. Such configuration information and/or settings and/or parameters may be usable by the SDR system to create an ad hoc network to facilitate a diagnostic session for an entity (e.g., refrigerator 110) and computing device 118, e.g., by way of XR device 105. Such configuration information and/or settings and/or parameters may relate to frequency, amplitude, power and modulation schemes, security or other information such as, for example, authentication credentials, cryptographic keys or certificates, network topology or address information such as IP address scheme(s), routing information or DNS information, and/or any other suitable information. In some embodiments, XR device 105 or 106 may be capable of communicating with refrigerator 110, e.g., via Bluetooth, without receiving or using such configuration information and/or settings and/or parameters. In some embodiments, refrigerator 110 may comprise communication circuitry that enables refrigerator 110 to communicate wirelessly (and/or via wired connection) with other devices such as XR device 105, e.g., via Bluetooth or other short-range wireless protocol, or via a proprietary RF diagnostic capability built in to refrigerator 110. For example, the configuration and/or settings may enable such proprietary RF diagnostic capability to be carried out without revealing sensitive information to user 102.

At 220, the SDR system may be configured based on the received configuration information and/or settings and/or parameters received at 216. For example, in some embodiments, such configuration information and/or settings and/or parameters may enable XR device 105 or 106 to communicate with refrigerator 110 by way of a short-range communication protocol or a proprietary communication protocol associated with a manufacturer of refrigerator 110. At 222, the SDR system may perform such communication with refrigerator 110, to act as a bridge between refrigerator 110 and server or device 118, thereby enabling the service technician or second user to begin a diagnostic session (at 224). For example, refrigerator 110 may be permitted to transmit data (e.g., diagnostic data concerning refrigerator 110) to, and receive data from (e.g., configuration data based on the diagnostic data), computing device 118 via the XR device 105. Computing device 118 may be permitted to transmit data (e.g., configuration data based on the diagnostic data) to, and receive data from (e.g., diagnostic data concerning refrigerator 110), refrigerator 110 via XR device 105.

In some embodiments, computing device 118 may be in communication with XR device 105 by way of network 120 (e.g., the Internet), and XR device 105 may be in communication with refrigerator 110 by way of a different, second communication protocol, e.g., Bluetooth or a proprietary protocol of the refrigerator manufacturer, and XR device 105 may act as a bridge enabling configuring of refrigerator 110 by server or device 118. Such bridged network may be temporary, to enable computing device 118 to configure components or settings of refrigerator 110 or any other suitable entity, perform firmware or software updates, modify a state of the refrigerator 110 (or other entity) to enable diagnostics, and/or other suitable actions.

In some embodiments, such service technician (e.g., which in some circumstances may be associated an avatar or virtual shop in XR environment 101) may employ a virtual diagnostic tool. Such virtual diagnostic tool may be capable of, through XR device 105 of user 102, establishing and configuring a temporary Bluetooth or other RF-based communication network or other communication protocol. Such temporary communication protocol may enable the second user to connect to the first user's real refrigerator device 110 by way of the established network and run a diagnostic test and retrieve the results of such test.

In some embodiments, at 226, the SDR system may optionally determine whether the diagnostic tool associated with computing device 118 is software-based (or external device-based). If the SDR system determines that the diagnostic tool is software-based, processing may proceed to 228; otherwise processing may proceed to 232. At 228 and 230, the diagnostic tool associated with computing device 118 may collect data or otherwise configure refrigerator 110, e.g., by transmitting data to, and receiving data from, XR device 105 regarding refrigerator 110. At 232 and 234, such as if an external device is to perform diagnostics, computing device 118 may utilize the SDR bridge provided by the SDR system to join a diagnostic tool provided by such external device to the bridged network.

As another example, user 102 may have, for example, locked himself or herself out of his or her car. In such instance, the aspects of FIGS. 1-2 may be used to enable XR device 105 to act as a bridge or proxy to establish communications between a car dealership and/or repair shop (e.g., a virtual dealership or shop in the metaverse, or a physical repair shop or dealer in the real world) and the car. For example, an automated or human service technician at the car dealership may determine a type of the car, and transmit configuration information and/or settings and/or parameters to enable XR device 105 to communicate with the car, and receive diagnostic information from the car via the XR device and/or cause the car to be unlocked via the XR device.

FIG. 3 shows an illustrative block diagram 300 for incorporating an SDR system in an XR device 105, in accordance with some embodiments of this disclosure. Block diagram 300 may include RF front end 301 and SDR back end 303. In some embodiments, each of RF front end 301 and SDR back end 303 may be embedded in XR device 105 and/or XR device 106, each of which may be configured to implement at least a portion of the SDR system. RF front end 301 may comprise one or more antennas 302, 304 for transmitting and receiving electromagnetic signals at frequencies within the electromagnetic spectrum, e.g., radio frequencies. In some embodiments, antenna 302 may be configured to receive and/or transmit signals of different frequencies than signals received and/or transmitted by antenna 304. As a non-limiting example, antenna 302 may be configured to receive and transmit signals in the Wi-Fi frequency band, whereas antenna 304 may be configured to receive and transmit signals in the cellular frequency band. RF front end 301 may comprise RF switch 306 and one or more filters 308, 310, e.g., a tunable band pass filter configured to pass a particular range of frequencies. RF front end 301 may comprise low noise amplifier 312 configured to provide power gain while lowering the noise of the signal, and digital attenuator 314, configured to reduce the amplitude of a signal. RF front end 301 may comprise mixer 316 configured to obtain an intermediate frequency signal based on an input of the received RF signal, which is modulated, and an input signal from local oscillators 326, which may be of a higher frequency than the received RF signal. In some embodiments, amplification may be performed at such intermediate frequency. RF front end 301 may comprise automatic gain control portion 318 to regulate the amplification of the signal. RF front end 301 may comprise carrier synthesizer 332, mixer 330, power amplifier 328, and a filter 310, e.g., to be used in outputting a signal. In some embodiments, any suitable number of the portions of RF front end 301 may be implemented as programmable digital components.

Analog to digital converter (ADC) 320 may convert the received analog signals to digital signals for processing by SDR processing module 322. SDR processing module 322 may correspond to one or more of a digital signal processor (DSP), a general purpose processor (GPP), field programmable gate arrays (FPGA), or programmable System on Chip (SoC), or any combination thereof, or any other suitable processor capable of executing the SDR system. SDR processing module 322 may be configured to perform demodulation of the signal on the receiving path and modulation of the signal on the transmission path. In some embodiments, SDR processing module 322 may be configured to perform any suitable types of operations, e.g., coding, decoding, equalization, frequency hopping, modulation type, demodulation type, filtering, etc., by executing different portions of software, to enable XR device 105 to perform communications using various communication protocols. Digital to analog converter (DAC) 334 may be converted to accept as input a digital signal and output an analog signal corresponding to the digital signal, e.g., for output or transmission. In some embodiments, SDR processing module 322 may be configured to perform one or more of the operations of DAC 334 or ADC 320, and/or perform one or more of the operations of any other suitable component(s) in FIG. 3. In some embodiments, SDR back end 303 may be understood as a software-based modem.

Figure 4:
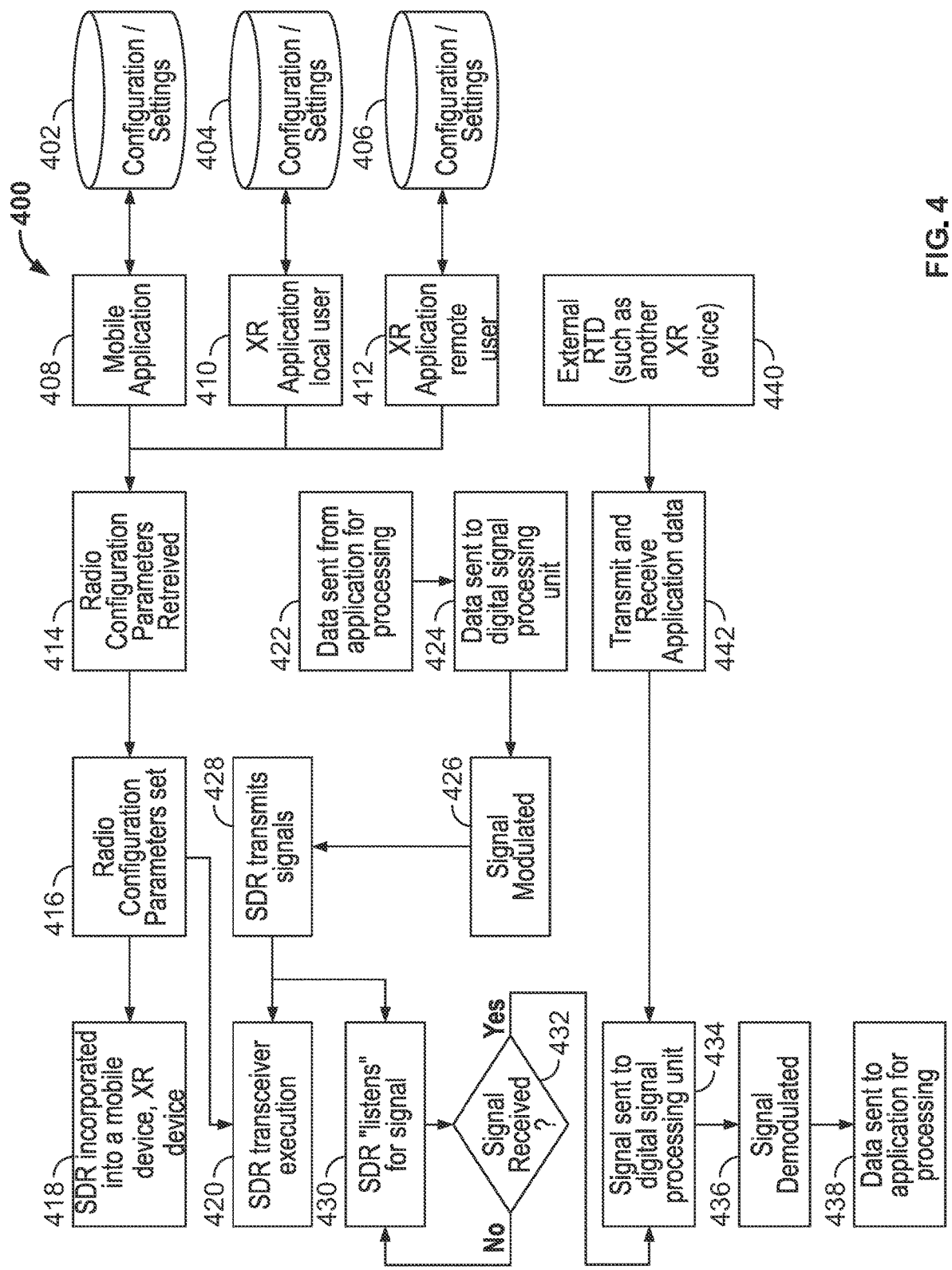
FIG. 4 is a flowchart of a detailed illustrative process for incorporating an SDR application in an XR device, in accordance with some embodiments of this disclosure.

FIG. 4 is a flowchart of a detailed illustrative process 400 for incorporating an SDR system in an XR device, in accordance with some embodiments of this disclosure. In various embodiments, the individual steps of process 400 may be implemented by one or more components of the devices and systems of FIGS. 1-13. Although the present disclosure may describe certain steps of process 400 (and of other processes described herein) as being implemented by certain components of the devices and systems of FIGS. 1-13, this is for purposes of illustration only, and it should be understood that other components of the devices and systems of FIGS. 1-13 may implement those steps instead.

At 402-406, configuration information and/or settings and/or parameters may be provided to various components of the SDR system, e.g., a mobile application (e.g., the SDR application running at least in part on XR device 105) at 408, an XR or SDR application running at least in part on XR device 105 within environment 100 at 410, and an XR or SDR application running at least in part on an XR device remote from environment 100 or associated with another user and/or device within environment 100 (at 412). Such configuration information and/or settings and/or parameters may relate to frequency, amplitude, power and modulation schemes, security or other information such as, for example, authentication credentials, cryptographic keys or certificates, network topology or address information such as IP address scheme(s), routing information or DNS information, and/or any other suitable information.

At 414, such configuration information and/or settings and/or parameters may be received. In some embodiments, such configuration information and/or settings and/or parameters may be received prior to or during an XR session (e.g., where an XR device is powered on, in use, or in an idle state) or during the execution of application code running on an XR device (e.g., such as, for example, a mobile device, smartphone or tablet). Electronic components of such XR device(s) may be configured to allow such configuration information and/or settings and/or parameters to be received or specified through the use of an application running on an XR device (e.g., based on received input from the XR device) and/or from within an XR environment (e.g., persistent storage device, such as, for example, USB memory or a dongle connected to the XR device) and/or from a remote resource (e.g., computing device 118 of FIG. 1) accessible from the XR device. Such electronic components may be incorporated into the XR device directly, and/or correspond to circuitry enabling a wired or wireless connection with a Radio Transmission Device (RTD), e.g., networking equipment 112, a Wi-Fi base station, SDR device with digital signal processing capability, short-range communication, such as, for example, Bluetooth transceivers (or other devices capable of modulating a carrier signal) or any other suitable device or any combination thereof.

At 416 and 418, the received configuration information and/or settings and/or parameters may be retrieved and used as part of incorporating the SDR system into the XR device. At 420, the XR device may perform execution of the SDR system based on one or more signals received at 428. Such signal may be generated based on data sent from an application (at 422, e.g., the SDR system) and sent to a digital signal processing unit (at 424), e.g., SDR processing module 322 of FIG. 3, and modulated at 426.

At 430, the SDR system may listen for a signal, e.g., the signal transmitted at 428; at 432, if no signal is detected processing may return to 430. Otherwise, if a signal is detected as being received at 432, processing may proceed to 434, where the signal may be sent to a digital signal processing unit (at 424), e.g., SDR processing module 322 of FIG. 3, for processing. At 436, the signal may be demodulated, and at 438 the demodulated signal may be sent to, e.g., the SDR system, for processing, e.g., output. In some embodiments, at 440 and 442, one or more signals may be received from an external RTD, e.g., another XR device, and processed at 434.

Figure 5:
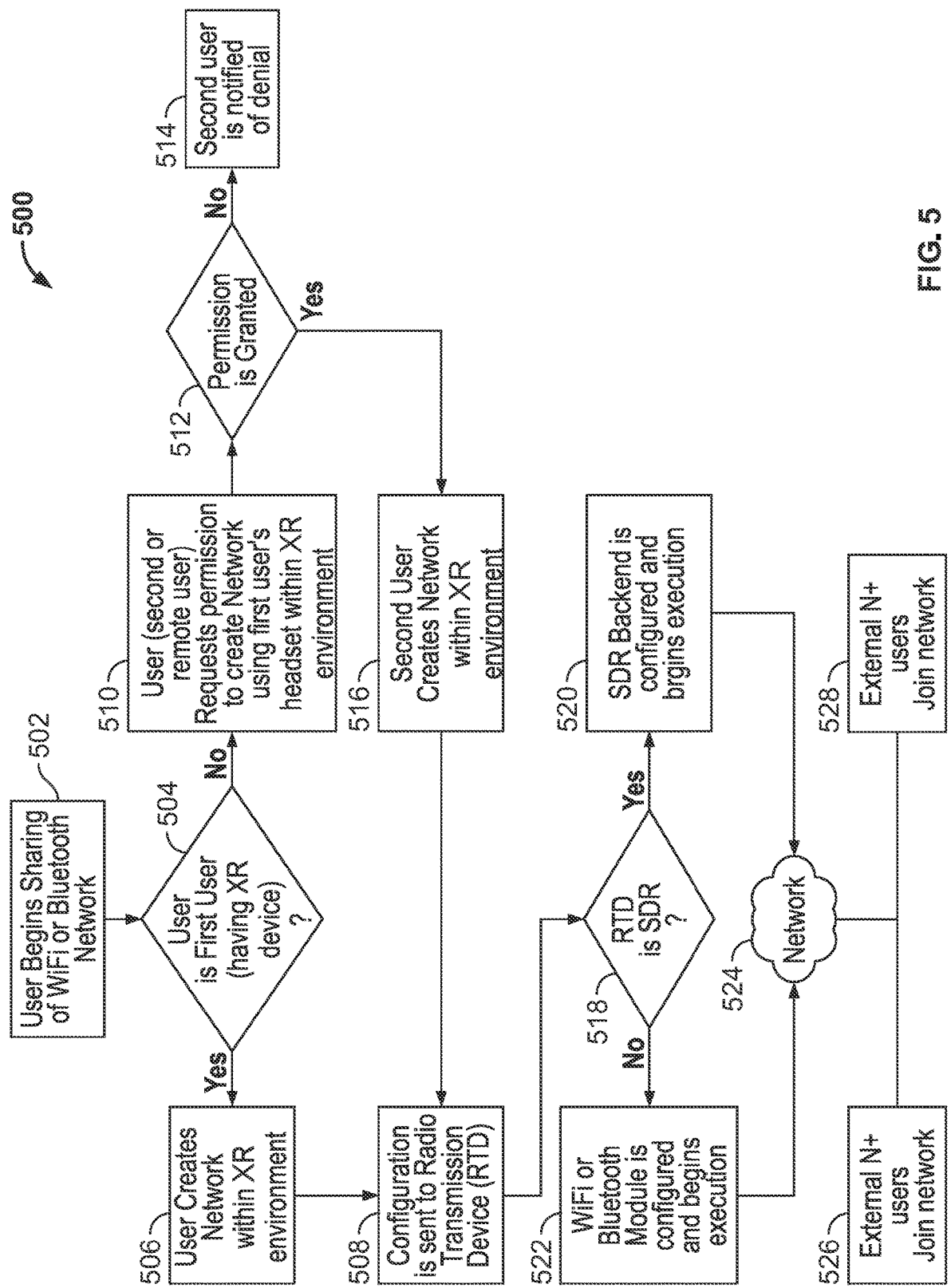
FIG. 5 is a flowchart of a detailed illustrative process for creating an ad hoc network, in accordance with some embodiments of this disclosure.

FIG. 5 is a flowchart of a detailed illustrative process 500 for creating an ad hoc network, in accordance with some embodiments of this disclosure. In various embodiments, the individual steps of process 500 may be implemented by one or more components of the devices and systems of FIGS. 1-13. Although the present disclosure may describe certain steps of process 500 (and of other processes described herein) as being implemented by certain components of the devices and systems of FIGS. 1-13, this is for purposes of illustration only, and it should be understood that other components of the devices and systems of FIGS. 1-13 may implement those steps instead.

At 502, an XR device (e.g., XR device 105 of FIG. 1) associated with a user (e.g., user 102 of FIG. 1) and executing the SDR system may begin sharing information related to an RF-based communication network or protocol, e.g., information related to a Wi-Fi network, Bluetooth configuration information, and/or any other suitable network or protocol. For example, such information may be advertised, broadcasted or transmitted via antenna 302 of FIG. 3, based on a user request or may be performed automatically, e.g., in response to detecting a triggering event, such as, for example, one or more XR devices detected as being proximate to XR device 105.

At 504, upon determining that the XR device (e.g., XR device 105) is associated with a user (e.g., user 102 of FIG. 1) within environment 100, processing may proceed to 506; otherwise processing may proceed to 510. At 506, the SDR system may create a network within environment 100 and/or XR environment 101 based on the information shared at 502, and such configuration information may be transmitted to other XR devices or RTDs within or remote from environment 100 and/or 101 (at 508).

At 510, having determined that the user specified at 502 of FIG. 5 is not user 102 associated with XR device 105 of FIG. 1, a second user (e.g., another user within environment 100 and/or 101 and/or a user remote from environment 100) may request permission to create a network using the XR device of user 102 within environment 100 and/or 101. At 512, the SDR system may determine whether permission has been granted, e.g., by user 102, to create such a network using the XR device of user 102. For example, if XR device 105 of user 102 is participating in an XR session, a selectable prompt, similar to notification overlay 116 of FIG. 1, may be presented to the user requesting such permission. If permission is not granted, e.g., the user selects "No" or a predefined period of time elapses without a response, processing may proceed to 514 and the second user may be notified. If permission is granted, e.g., the user selects "Yes" or a setting in the user's profile specifies that the second user should be granted permission to create such networks, processing may proceed to 516. At 516, the SDR system may create a network within environment 100 and/or XR environment 101 based on the information shared at 502, and such configuration information may be transmitted at block 508 to other XR devices or RTDs within or remote from environment 100 and/or 101.

At 518, the SDR system may determine whether the XR device (e.g., XR device 105) associated with a user (e.g., user 102 of FIG. 1) supports SDR capabilities. If yes, processing may proceed to 520; otherwise processing may proceed to 522. At 520, an SDR back end (e.g., SDR back end 303) of the XR device may be configured and begin execution, e.g., to enable the same programmable hardware to facilitate communications over a plurality of communication protocols or networks 524, e.g., FM radio, Wi-Fi, Bluetooth, and/or any other suitable protocol. At 528, external users (e.g., within environment 100 and/or 101, or remote from environment 101) may join such network or communication protocol or network 524 as established by the SDR back end, by way of an XR device or other device. In some embodiments, such ad hoc network may enable communications over RF-based protocols, e.g., AM/FM radio, walkie talkie, etc., even if no Internet connection is available. Once configuration for the new RF-based communication protocol or communication network has been received, entered, or loaded into the RTD, the RTD (e.g., when the RTD is an SDR) may load the configuration parameters and begin transmitting and receiving signals based on the configured parameters. In some embodiments, the configured parameters may include RF band, Beacon Intervals, service set identifier (SSID), advertised services such as, for example, when the SDR is configured to operate as a Bluetooth RTD, or any other suitable parameter, or any combination thereof). In some embodiments, the RTD or SDR may be configured as a Wi-Fi network (base station), and a set of both local and remote users could create a shared ad hoc network or virtual private network (VPN) for private XR communications among a plurality of XR devices.

At 522, if it is determined the XR device (e.g., XR device 105) associated with a user (e.g., user 102 of FIG. 1) does not support SDR capabilities, a module (e.g., a Wi-Fi or Bluetooth module) may be configured for communication. For example, configuration parameters may be loaded on the device, and the device may begin transmitting and receiving signals, e.g., at 526, a device external to or within environment 100 and/or 101 may join or pair to the established ad hoc network or communication protocol. For example, one or more devices may interact with each other within an XR environment. In some embodiments, an XR device may be configured to broadcast as a Wi-Fi hotspot or as a Bluetooth device advertising services such as file transfer or audio playback.

In some embodiments, within an XR environment (e.g., generated for display at XR device 105 of user 102) the physical RTD interface may be virtualized to allow remote users (e.g., using a mobile device or an XR device, external to or within the XR environment) to join or pair with the network to transmit and receive data from within the XR environment.

Figure 6:
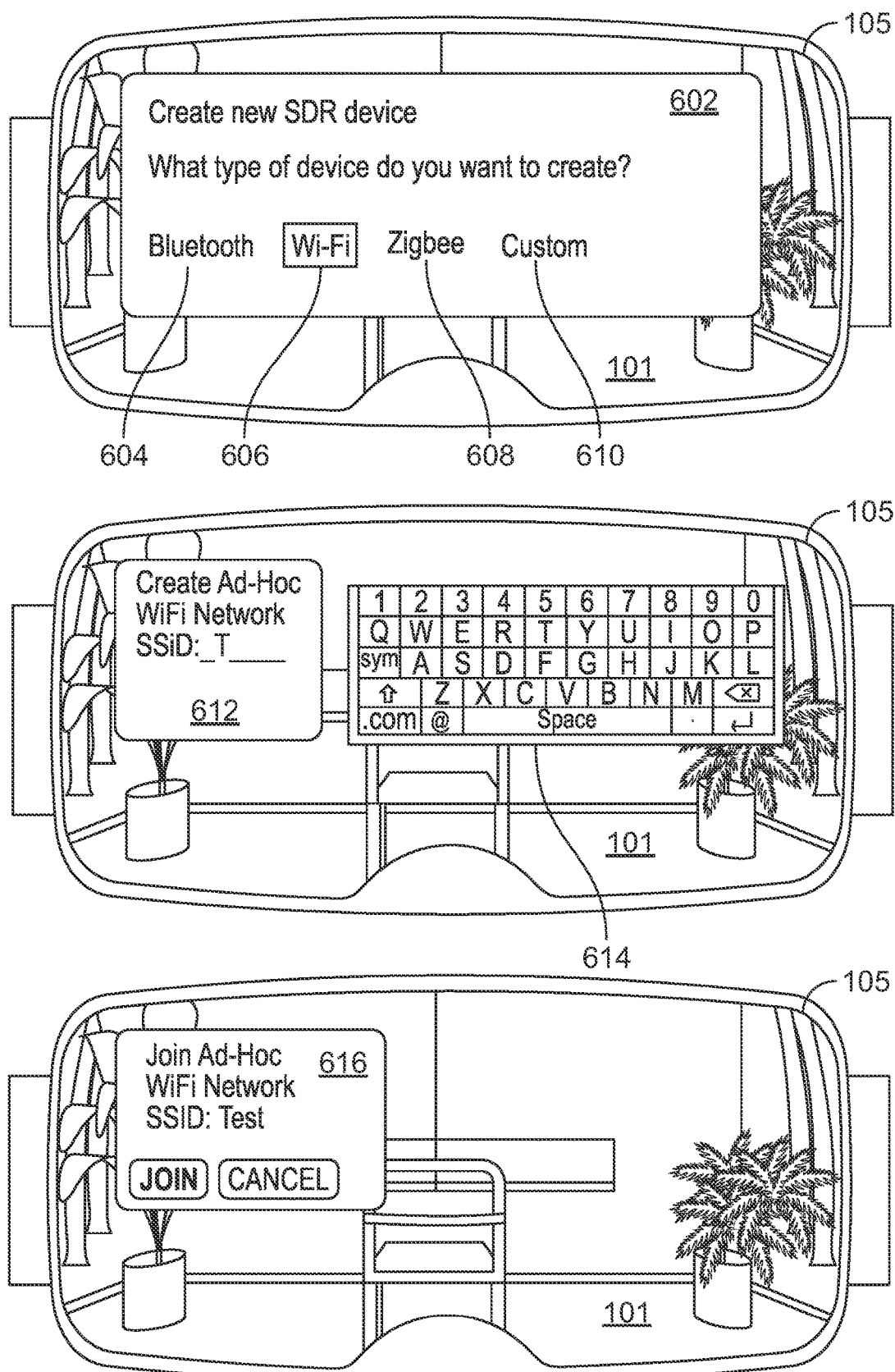
FIG. 6 shows illustrative user interface screens for creating an ad hoc network, in accordance with some embodiments of this disclosure.

FIG. 6 shows illustrative user interface screens for creating an ad hoc network, in accordance with some embodiments of this disclosure. The SDR system may cause XR device 105 to generate for display XR environment 101 and may generate for display overlay or XR portion 602. XR portion 602 may comprise one or more selectable options to enable creation of a new ad hoc network or custom communication protocol. For example, XR portion 602 may comprise option 604 to create a Bluetooth communication network, option 606 to create a Wi-Fi network, option 608 to create a Zigbee communication network, option 610 to create a custom communication network or protocol, and/or any other option for creating any other suitable RF-based network.

For example, based on the receiving selection of option 606, the SDR system may generate for presentation to user 102 of XR device 105 overlay or XR portion 612 indicating the user's selection to "Create Ad Hoc WiFi Network," and may provide XR portion 614 at which alphanumeric characters may be entered to provide a name for the ad hoc network. For example, the SDR system may enable XR device 105 to act as a Wi-Fi access point or base station, based on programming executed by SDR back end 303 of FIG. 3.

Once the ad hoc network is created, XR portion 616 may be generated for presentation to enable user 102 of XR device to join the created network. In some embodiments, XR portion 616 may be presented at XR devices or other devices of other users within environment 100 and/or 101, or to XR devices or other devices of other users external to environment 100 and/or 101, to enable one or more of such users to join the created ad hoc network. Such aspects shown in FIG. 6 enable creation of, and specification of parameters of, an on-the-fly ad hoc network from within an XR environment, to enable multiple users to join the network and interact. In some embodiments, if the SDR system detects that another user is proximate to user 102 and/or XR device 105 in physical environment 100 and/or XR environment 101, the SDR system may prompt user 102 to create an ad hoc network and/or prompt such other user to join the created ad hoc network. In some embodiments, the remote user may be permitted to create an ad hoc network using XR device 105 of user 102 in environment 100 and 101.

Figure 7:
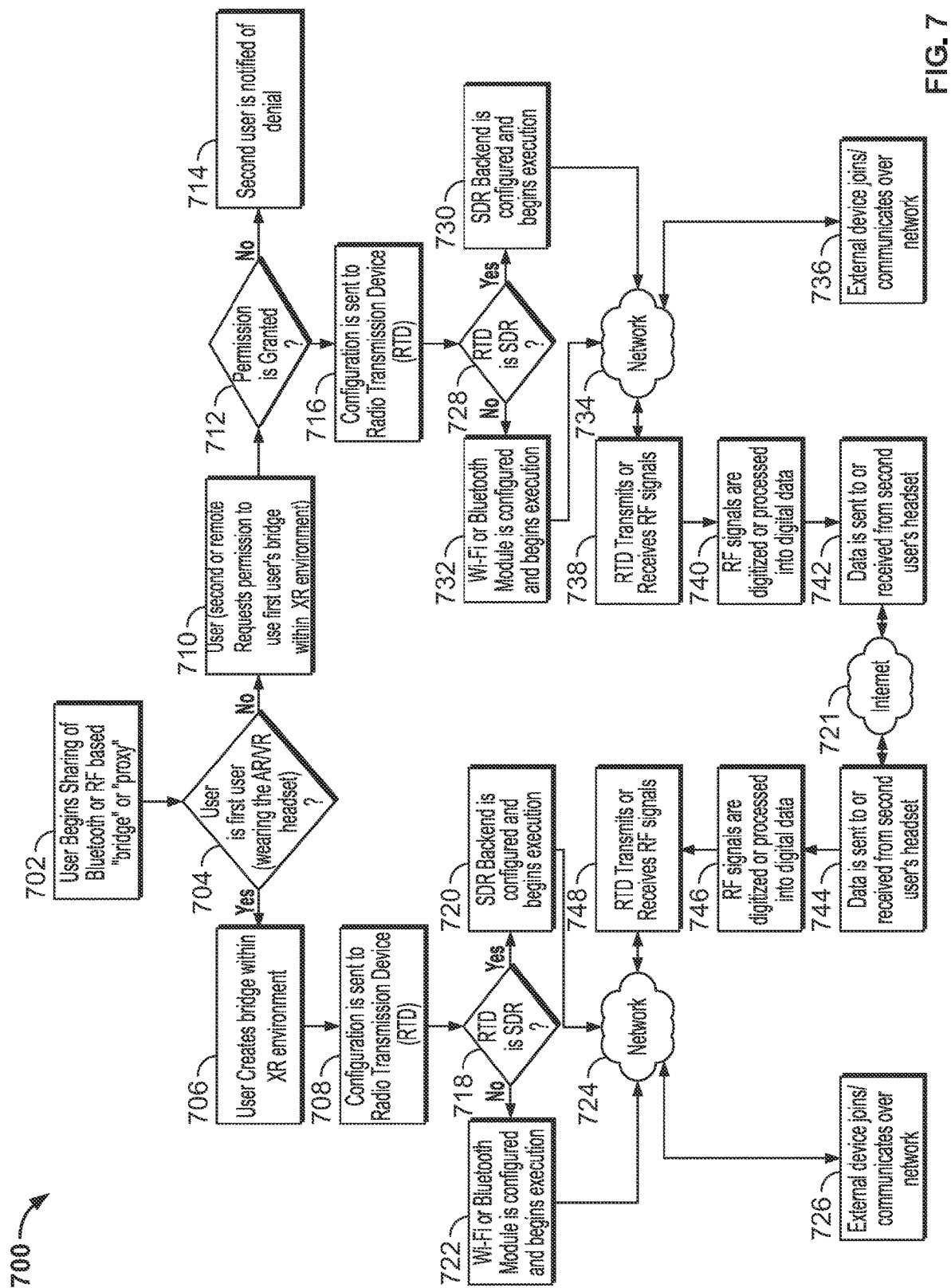
FIG. 7 is a flowchart of a detailed illustrative process for virtually extending a network range, in accordance with some embodiments of this disclosure.

FIG. 7 is a flowchart of a detailed illustrative process 700 for virtually extending a network range, in accordance with some embodiments of this disclosure. In various embodiments, the individual steps of process 700 may be implemented by one or more components of the devices and systems of FIGS. 1-13. Although the present disclosure may describe certain steps of process 700 (and of other processes described herein) as being implemented by certain components of the devices and systems of FIGS. 1-13, this is for purposes of illustration only, and it should be understood that other components of the devices and systems of FIGS. 1-13 may implement those steps instead.

In some embodiments, the aspects of FIG. 7 may be used to "virtually extend" the range of RF-based communication networks or protocols (e.g., Bluetooth or Zigbee) so that such network or protocol is accessible to remote users within XR environment 101 or to remote XR devices or other devices, e.g., comprising an RTD or SDR. Such aspects may enable devices within a range of a first user's XR device to be accessible for use by devices that are within range of a second user's XR device.

At 702, an XR device (e.g., XR device 105 of FIG. 1) associated with a user (e.g., user 102 of FIG. 1) and executing the SDR system may begin sharing information related to an RF-based communication network or protocol bridge or proxy, e.g., information related to a Wi-Fi network, Bluetooth configuration information, and/or any other suitable network or protocol. For example, such information may be advertised, broadcasted or transmitted via antenna 302 of FIG. 3, based on a user request, or may be performed automatically, e.g., in response to detecting a triggering event, such as, for example, one or more XR devices detected as being proximate to XR device 105.

At 704, upon determining that the XR device (e.g., XR device 105) is associated with a user (e.g., user 102 of FIG. 1) within environment 100, processing may proceed to 706; otherwise processing may proceed to 710. At 706, the SDR system may create a bridge or proxy network within environment 100 and/or XR environment 101 based on the information shared at 702, and such configuration information may be transmitted to other XR devices or RTDs within or remote from environment 100 and/or 101 (at 708).

At 710, having determined that the user specified at 702 of FIG. 7 is not user 102 associated with XR device 105 of FIG. 1, a second user (e.g., another user within environment 100 and/or 101 and/or a user remote from environment 100) may request permission to create or use the bridge or proxy network using the XR device of user 102 within environment 100 and/or 101. At 712, the SDR system may determine whether permission has been granted, e.g., by user 102, to create such a network using the XR device of user 102. For example, if XR device 105 of user 102 is participating in an XR session, a selectable prompt, similar to notification overlay 116 of FIG. 1, may be presented to the user requesting such permission. If permission is not granted, e.g., the user selects "No" or a predefined period of time elapses without a response, processing may proceed to 714 and the second user may be notified. If permission is granted, e.g., the user selects "Yes" or a setting in the user's profile specifies that the second user should be granted permission to create or use such networks, processing may proceed to 716. At 716, configuration information for such bridge or proxy network may be transmitted to other XR devices or RTDs within or remote from environment 100 and/or 101.

At 718 (following block 708), the SDR system may determine whether the XR device (e.g., XR device 105) associated with a user (e.g., user 102 of FIG. 1) supports SDR capabilities. If yes, processing may proceed to 720; otherwise processing may proceed to 722. At 720, an SDR back end (e.g., SDR back end 303) of the XR device may be configured and begin execution, e.g., to enable the same programmable hardware to facilitate communications over a plurality of communication protocols or networks 724, e.g., FM radio, Wi-Fi, Bluetooth, and/or any other suitable protocol. At 726, external users (e.g., within environment 100 and/or 101, or remote from environment 101) may join such network or communication protocol or network 724 as established by the SDR back end, by way of an XR device or other device. In some embodiments, network 724 may act a proxy or bridge, e.g., to enable a second user to communicate with a device in environment 100 by way of XR device 105 of first user 102.

Blocks 728-732 may be performed in a similar manner as 718-722, respectively. Communication protocol network 734 may be implemented in a similar manner as network 724. For example, network 734 may act a proxy or bridge, e.g., to enable a second user to communicate with a device in environment 100 by way of XR device 105 of first user 102. In some embodiments, 736 may be implemented in a similar manner as 726.

In some embodiments, 736-748 may be performed to enable communications between XR device 105 of first user 102 and the device of the second user, e.g., external to environment 100 and/or 101. At 738, the device of the second user, e.g., an XR device, may initiate the transmission of data to, or the reception of data from, XR device 105 of user 102 via network 721, e.g., the Internet. At 740, RF signals corresponding to the data to be sent may be digitized and at 742, may be transmitted to XR device 105 of user 102 via network 721. At 744-748, the digitized data may be received by XR device 105 of user 102, and may be forwarded (e.g., to refrigerator 110 of FIG. 1) by way of ad hoc network 724. Similarly, at 748, the device of the XR device 105 of first user 102 may initiate the transmission of data to, or the reception of data from, a device of the second user, e.g., external to environment 100 and/or 101, via network 721, e.g., the Internet. At 746, RF signals corresponding to the data to be sent may be digitized and at 744, may be transmitted to the device of the second user via Internet 721. For example, such data may be related to diagnostic data, communicated from an entity (e.g., refrigerator 110 of FIG. 1) via network 724 (e.g., a short-range communication network or any other suitable network), which may be forwarded to the second device (e.g., computing device 118) via Internet 721. For example, such short-range communication network may not extend in range to the location of the second user, but nonetheless access to data transmitted over such network may be provided by way of the bridge or proxy network 724. As another example, the aspects of FIG. 7 may enable the second user remote from environment 100 and/or 101, or within environment 100 and/or 101, to control an entity (e.g., a smart light) by way of the bridge or proxy network provide by way of XR device 105.

In some embodiments, the aspects of FIG. 7 may enable a group or groups of users to "join" and exchange data if at least one user within a group of users has "bridged" to another user within such group (or another group) of users. For example, the second (e.g., remote) device could establish a "bridge" between the first RTD and the second RTD in order to create ad hoc networks that extend beyond the physical range of the first or second RTD. In some embodiments, such aspects may be used to create VPNs between disparate groups of users such as when a private or secure XR environment is desired.

In some embodiments, the configuration of the connected device interfaces may be established and transmitted from a first XR device to a plurality of XR devices or other devices without the need for configuration to be performed individually on each XR devices. For example, the advertising" and discovery of such virtual XR devices may be presented within a mobile application user interface or XR environment.

Figure 8:
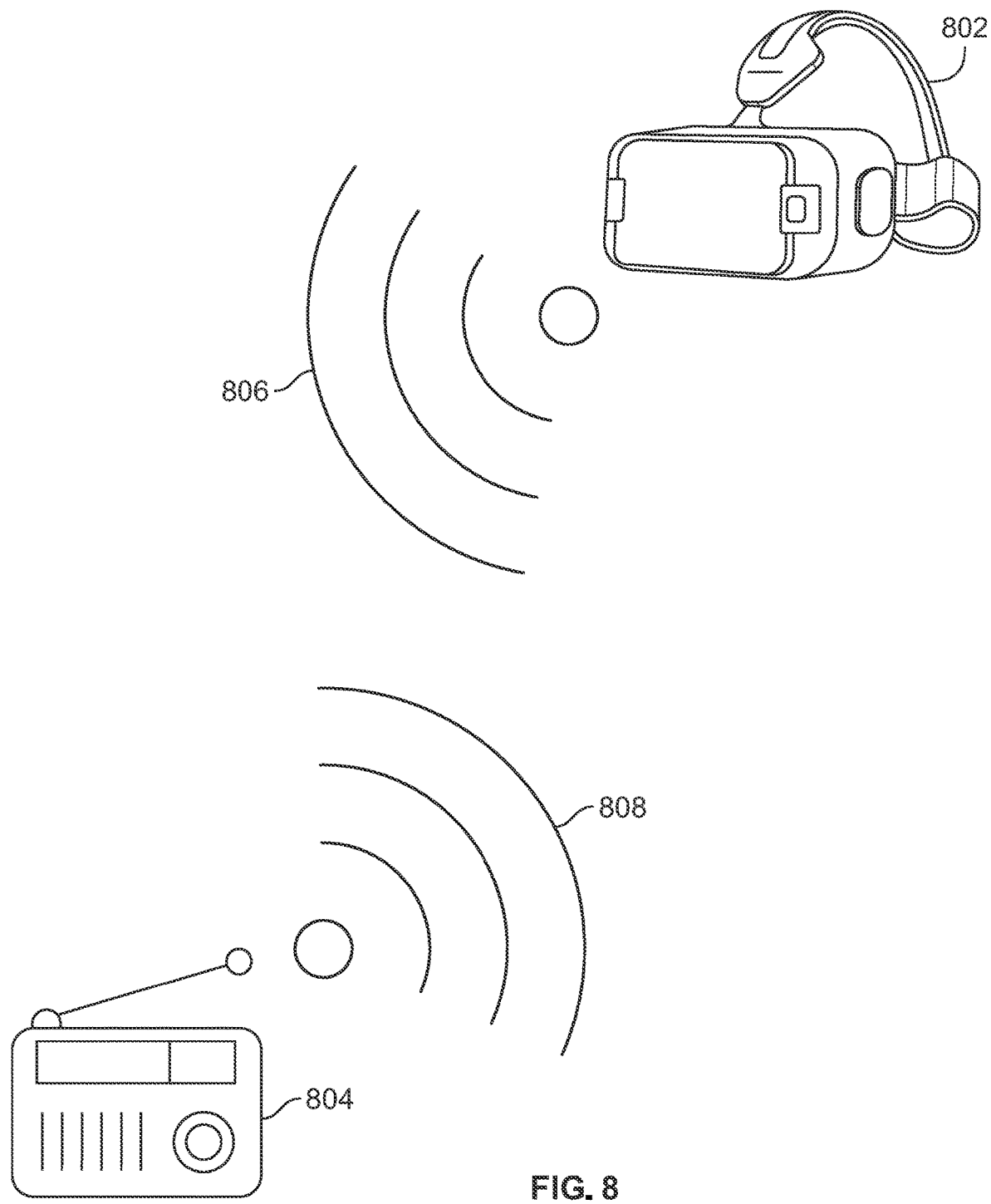
FIG. 8 shows an illustrative scenario in which an XR device executing an SDR application may transmit or receive radio frequency signals, in accordance with some embodiments of this disclosure.

FIG. 8 shows an illustrative scenario in which an XR device executing an SDR application may transmit or receive radio frequency signals, in accordance with some embodiments of this disclosure. As shown in FIG. 8, the SDR system may cause XR device 802 (which may correspond to XR device 105) to be configured to transmit or broadcast frequency modulation (FM) RF signals 806 (or amplitude modulation (AM) RF signals or any other suitable RF signals in the electromagnetic spectrum of any suitable frequency) to one or more other devices, e.g., radio 804. In some embodiments, radio 804 may play back the received signal 806 by outputting signal 808 based on received signal 806. In some embodiments, the SDR system may permit a user to establish an "FM radio" by way of a remote users' XR device from which to broadcast music or sounds that may be received and played back by a speaker of physical radio 804 or any other suitable device. For example, the SDR system may enable an XR device, which may not include dedicated hardware to generate FM radio frequency signals, to utilize software-based techniques to generate such signals.

Figure 9:
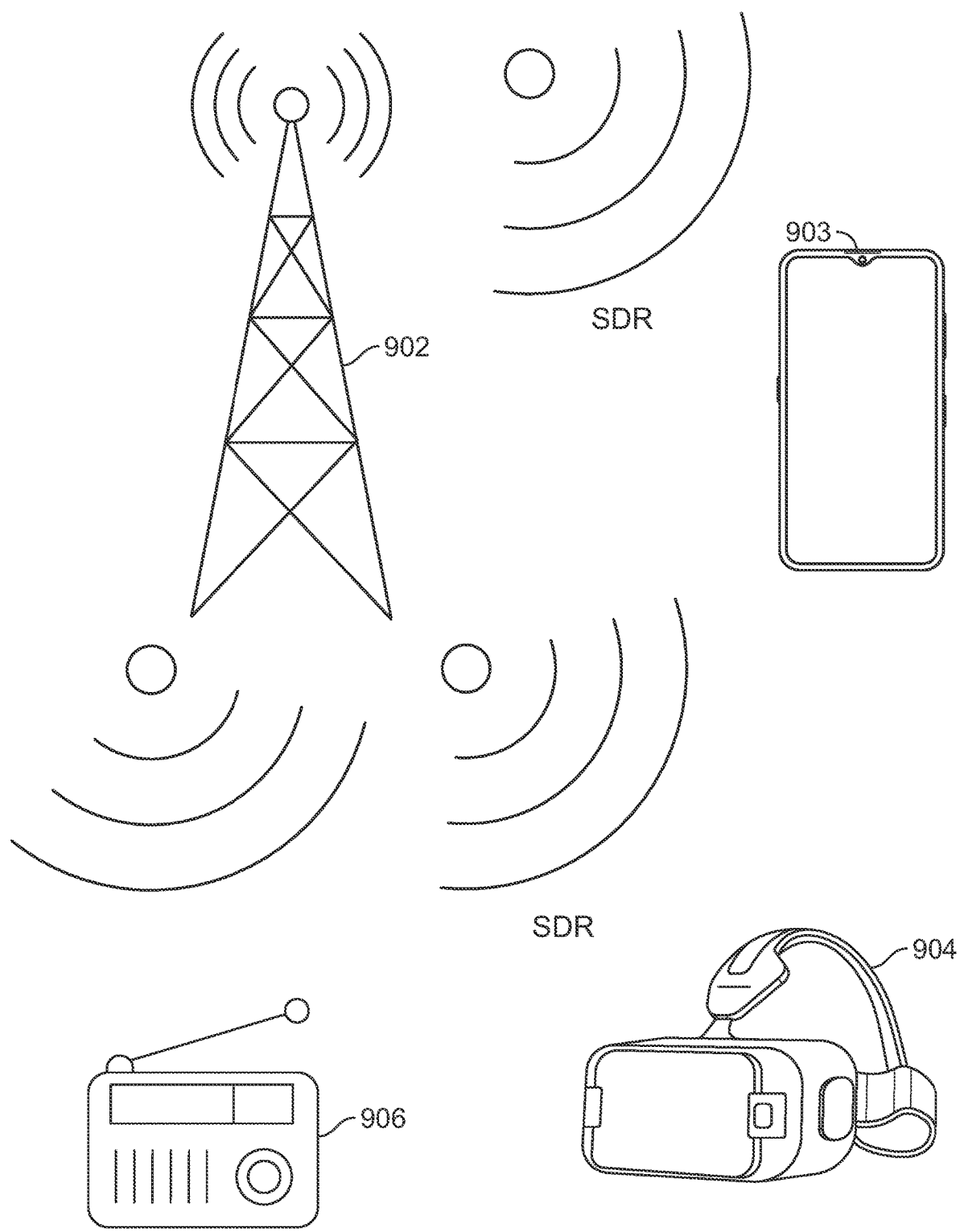
FIG. 9 shows an illustrative scenario in which an XR device executing an SDR application may transmit or receive radio frequency signals, in accordance with some embodiments of this disclosure.

FIG. 9 shows an illustrative scenario in which an XR device executing an SDR application may transmit or receive radio frequency signals, in accordance with some embodiments of this disclosure. As shown in FIG. 9, radio transmission tower 902 may transmit or broadcast RF signals to XR device 903 (e.g., a smartphone or tablet executing the SDR application, which may correspond to XR device 106), XR device 904 (e.g., XR goggles executing the SDR application, which may correspond to XR device 105) and radio 906. The SDR system may enable each of XR device 903 and 904 to receive and play back information contained in the broadcast RF signals. For example, the information transmitted or broadcast by radio transmission tower 902 may be an emergency broadcast related to an ongoing or impending weather event (e.g., a hurricane) or a live radio broadcast (e.g., play-by-play of a sporting event). The SDR system may enable XR device 903 and 904 to receive and play back such information, which may be FM or AM RF signals or short wave radio. The receipt of such signals may be particularly useful if the Internet and cellular communications are not available due to power outages or downed power infrastructure caused by the hurricane, for example, wherein in such cases the SDR system may enable XR device 903 and 904 to receive useful information that such devices are not typically capable of receiving. In another example, the information transmitted or broadcast by radio transmission tower 902 may be a live radio broadcast (e.g., play-by-play of a sporting event). The SDR system may enable XR device 903 and 904 to receive and play back such information, which may be FM or AM RF signals or short wave radio. The receipt of such signals may be particularly useful if the Internet and cellular communications are not available due to being out of market or blacked-out, for example, wherein in such cases the SDR system may enable XR device 903 and 904 to receive useful information that such devices are not typically capable of receiving.

In some embodiments, the SDR system may enable an XR device or other device to transmit RF communication, which may be proprietary or unknown to the user, e.g., those required to open a garage door or gate, or to trigger or configure an alarm, or to create an RF "fence" which that trigger devices such as, for example, invisible fence dog collars.

In some embodiments, the SDR system may enable an XR device to establish a connection to interact with an XR environment that is being generated for display in an isolated way on a particular XR device. For example, such aspects may be employed in a circumstance where a private or secure XR experience is desired (e.g., in a governmental or industrial application that might require a high level of security) or where participants do not wish the XR interactions to traverse a wide area network.

In some embodiments, such as, for example, in a circumstance where a satellite terminal is in communication with an XR device or other device, the SDR system may permit a remote user within the XR environment to remotely configure operating parameters of the satellite. For example, the parameters may include cryptographic certificates and keys, band (e.g., KA, KU, X), and the SDR system may enable creation of a "virtual" satellite network with nodes comprising a plurality of "terrestrial-based devices" such as XR devices and/or cellular base stations. In some embodiments, the SDR system may enable at least one of such nodes to have the ability to modulate a carrier signal at a particular band and have the power and physical antenna (e.g., a reflector or dish) used for satellite communication.

In some embodiments, the SDR system may enable a plurality of devices (e.g., XR devices or other devices) to be remotely configured to act as a single network (e.g., cellular network). For example, in the case of a natural disaster, the SDR system may enable a plurality of mobile devices to be used to provide cellular "repeater" service to other devices. In some embodiments, the SDR system may be configured to facilitate the onboarding of devices, e.g., the connection of a particular device, which may not have an input interface (e.g., a voice assistant or speaker), to a Wi-Fi network, or any other suitable communication network.

Figure 10:
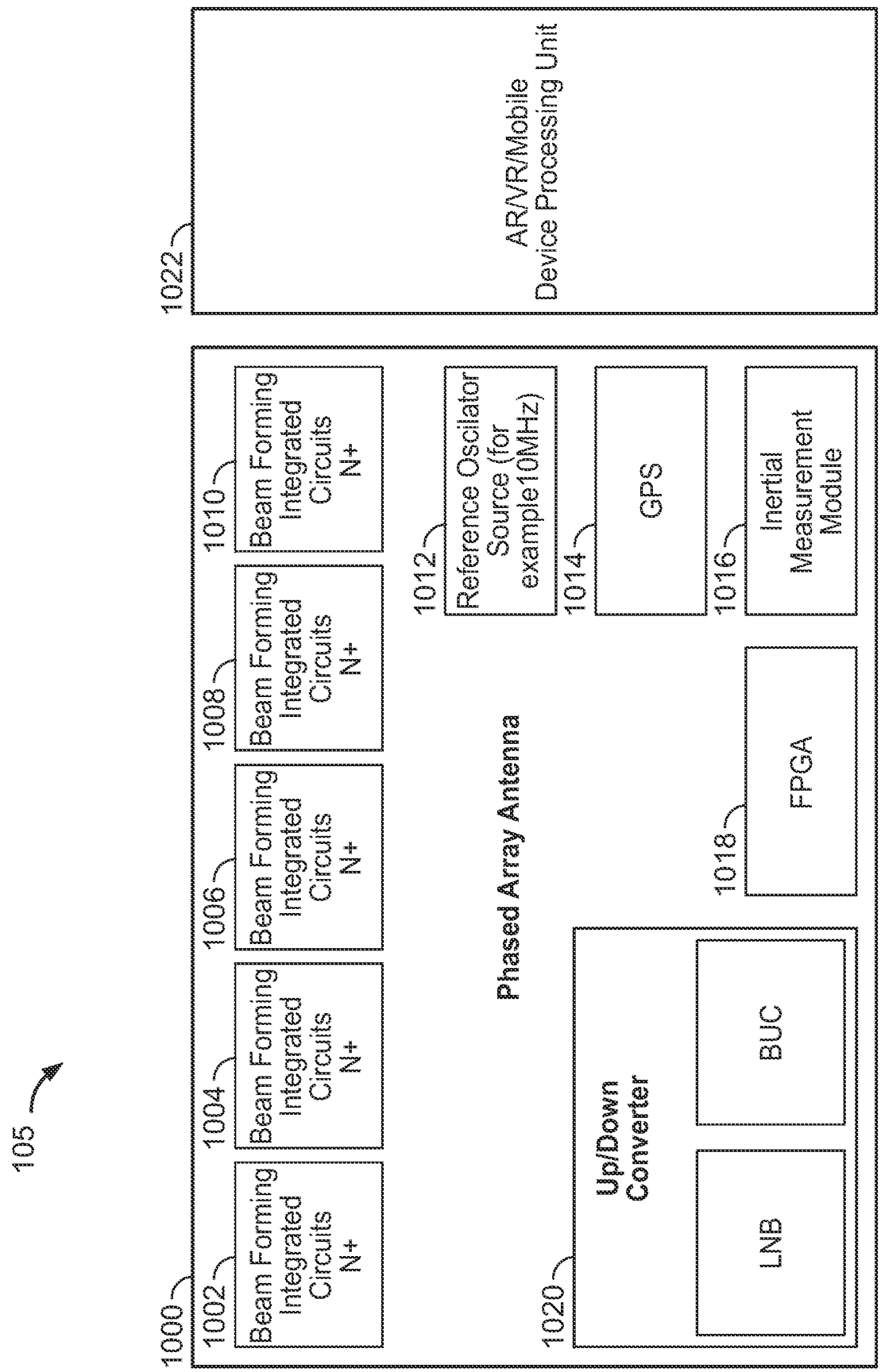
FIG. 10 shows an illustrative block diagram 1000 of incorporating a phased array antenna into an XR device executing an SDR application, in accordance with some embodiments of this disclosure.

FIG. 10 shows an illustrative block diagram 1000 of incorporating a phased array antenna into an XR device executing an SDR application, in accordance with some embodiments of this disclosure. As shown in FIG. 10, XR device 105 (e.g., comprising processing unit 1022) may comprise phased array antenna 1000, which may enable XR device 105 to listen and/or receive multiple satellite signals simultaneously transmitted from, e.g., low earth orbit satellites such as those that comprise a cluster of satellites, and/or transmit data to such satellite(s). Phased array antenna 1000 may enable the adjustment of a radiated wave pattern of a plurality of antennas without having to move such antennas, and may be configured to transmit or receive signals in a particular direction. For example, the antennas of the array may be optimally spaced apart and the phasing of signals of such antennas may be optimized to maximize performance of the antenna array.

Phased array antenna 1000 may comprise a plurality of components, e.g., integrated circuit (IC) chips, such as, for example, phased array beam forming components 1002, 1004, 1006, 1008, 1010, reference oscillator source 1012, global positioning system (GPS) component 1014, inertial measurement module 1016, FPGA 1018 and up/down converter 1020. Phased array antenna 1000 may comprise any suitable number of each component, and such components may be in wired or wireless communication. Phased array beam forming components 1002-1010 may be configured to adjust phase or other characteristics of a received signal or a signal to be transmitted, and may each correspond to a particular antenna. Inertial measurement module 1016 may comprise, e.g., accelerometers, gyroscopes, magnetometers and/or any other suitable component configured to detect movement or orientation of XR device 105. Up/down converter 1020 may be configured to convert an RF signal up to a higher frequency, e.g., for transmission or uplink, and convert an RF signal down to an intermediate frequency or a lower frequency, e.g., upon reception of the signal or downlink. Up/down converter 1020 may comprise a low noise block downconverter (LNB) for reception and downconverting and a block upconverter (BUC) for transmission and up-converting. In some embodiments, the phased array antenna may be positioned at any suitable position with an XR device, e.g., behind a screen of the XR device.

Figure 11:
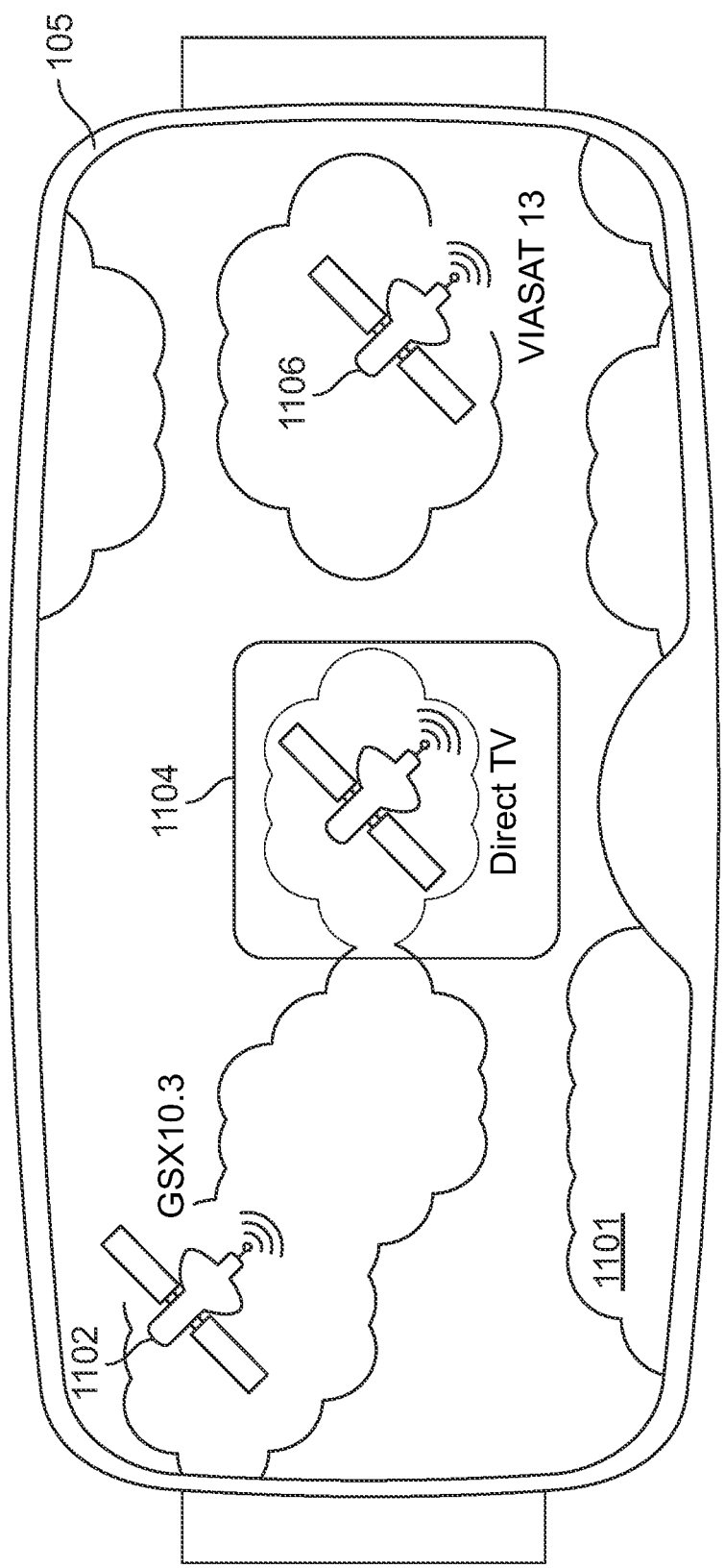
FIG. 11 shows an illustrative interactive environment provided by an XR device, in accordance with some embodiments of this disclosure.

FIG. 11 shows an illustrative interactive environment 1101 provided by an XR device, in accordance with some embodiments of this disclosure. As shown in FIG. 11, the SDR system may enable XR device 105 to generate for presentation XR portions 1102, 1104 and 1106 respectively representing satellites and indicating respective locations of such satellites. In some embodiments, while such view or an overlay of satellites that are passing overhead in orbit is displayed, the SDR system may detect that a user looked at or otherwise selected a particular satellite. In response, the SDR system may set particular configuration parameters to be used when configuring the SDR portion of a terrestrial-based satellite terminal. For example, the SDR system may enable the XR device comprising phased array antenna 1000 to search for satellite signals in certain directions in order to ascertain the location of particular satellites and/or enable a user to receive data from and/or transmit data to a particular satellite.

In some embodiments, the SDR system may enable an XR device to receive, e.g., satellite transmissions from a satellite radio service such as Sirius XM Radio or another satellite content provider such as DirecTV, or from a governmental entity. For example, XM radio may be associated with different modulation schemes and/or frequencies, but the SDR system may be capable of executing code specific to such characteristics of XM radio in order to receive XM radio signals from the XM radio satellite, e.g., provided the user is a paid subscriber. In some embodiments, an XR device worn or used by an operator in a remote location may receive XR content directly at an XR device, e.g., with cryptographic and other data required to receive a secure signal configured in real time, or an operator could access content in an unsecured way.

FIGS. 12-13 describe illustrative devices, systems, servers, and related hardware for enabling communications in an XR environment, in accordance with some embodiments of this disclosure. FIG. 12 shows generalized embodiments of illustrative user devices 1200 and 1201, which may correspond to, e.g., XR device 105 and/or 106 of FIG. 1, or any other suitable device, or any combination thereof. For example, user device 1200 may be a smartphone device, a tablet, smart glasses, a virtual reality or augmented reality device, or any other suitable device capable of consuming media assets and capable of transmitting and receiving data over a communication network. In another example, user device 1201 may be a user television equipment system or device. User television equipment device 1201 may include set-top box 1215. Set-top box 1215 may be communicatively connected to microphone 1216, audio output equipment (e.g., speaker or headphones 1214), and display 1212. In some embodiments, microphone 1216 may receive audio corresponding to a voice of a user, e.g., a voice command. In some embodiments, display 1212 may be a television display or a computer display. In some embodiments, set-top box 1215 may be communicatively connected to user input interface 1210. In some embodiments, user input interface 1210 may be a remote control device. Set-top box 1215 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of user devices are discussed below in connection with FIG. 12. In some embodiments, device 1200 may comprise any suitable number of sensors, as well as a GPS module (e.g., in communication with one or more servers and/or cell towers and/or satellites) to ascertain a location of device 1200.

Each one of user device 1200 and user device 1201 may receive content and data via input/output (I/O) path 1202. I/O path 1202 may provide content (e.g., broadcast programming, on-demand programming, Internet content, content available over a local area network (LAN) or wide area network (WAN), and/or other content) and data to control circuitry 1204, which may comprise processing circuitry 1206 and storage 1208. Control circuitry 1204 may be used to send and receive commands, requests, and other suitable data using I/O path 1202, which may comprise I/O circuitry. I/O path 1202 may connect control circuitry 1204 (and specifically processing circuitry 1206) to one or more communications paths (described below). I/O functions may be provided by one or more of these communications paths, but are shown as a single path in FIG. 12 to avoid overcomplicating the drawing. While set-top box 1215 is shown in FIG. 12 for illustration, any suitable computing device having processing circuitry, control circuitry, and storage may be used in accordance with the present disclosure. For example, set-top box 1215 may be replaced by, or complemented by, a personal computer (e.g., a notebook, a laptop, a desktop), a smartphone (e.g., device 1200), a tablet, a network-based server hosting a user-accessible client device, a non-user-owned device, any other suitable device, or any combination thereof.

Control circuitry 1204 may be based on any suitable control circuitry such as processing circuitry 1206. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 1204 executes instructions for the SDR system stored in memory (e.g., storage 1208). Specifically, control circuitry 1204 may be instructed by the SDR system to perform the functions discussed above and below. In some implementations, processing or actions performed by control circuitry 1204 may be based on instructions received from the SDR system.

In client/server-based embodiments, control circuitry 1204 may include communications circuitry suitable for communicating with a server or other networks or servers. The SDR system may be a stand-alone application implemented on a device or a server. The SDR system may be implemented as software or a set of executable instructions. The instructions for performing any of the embodiments discussed herein of the SDR system may be encoded on non-transitory computer-readable media (e.g., a hard drive, random-access memory on a DRAM integrated circuit, read-only memory on a BLU-RAY disk, etc.). For example, in FIG. 12, the instructions may be stored in storage 1208, and executed by control circuitry 1204 of a device 1200.

In some embodiments, the SDR system may be or comprise a client/server application (e.g., the SDR application and/or the XR application) where only the client application resides on device 1200, and a server application resides on an external server (e.g., server 1304). For example, the SDR system may be implemented partially as a client application on control circuitry 1311 of server 1304 and partially on server 1304 as a server application running on control circuitry 1011. Server 1304 may be a part of a local area network with one or more of devices 1300 or may be part of a cloud computing environment accessed via the internet. In a cloud computing environment, various types of computing services for performing searches on the Internet or informational databases, providing storage (e.g., for a database) or parsing data are provided by a collection of network-accessible computing and storage resources (e.g., server 1304), referred to as "the cloud." Device 1200 may be a cloud client that relies on the cloud computing capabilities from server 1304 to determine whether processing should be offloaded and facilitate such offloading. When executed by control circuitry 1204 or 1311, the SDR system may instruct control circuitry 1204 or 1311 circuitry to perform processing tasks for the client device and facilitate communications associated with an XR environment. The client application may instruct control circuitry 1204 to determine whether processing should be offloaded.

Control circuitry 1204 may include communications circuitry suitable for communicating with a server, social network service, a table or database server, or other networks or servers The instructions for carrying out the above mentioned functionality may be stored on a server (which is described in more detail in connection with FIG. 12). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 12). In addition, communications circuitry may include circuitry that enables peer-to-peer communication of user devices, or communication of user devices in locations remote from each other (described in more detail below).

Memory may be an electronic storage device provided as storage 1208 that is part of control circuitry 1204. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 1208 may be used to store various types of content described herein as well as SDR system data described above. Nonvolatile memory may also be used (e.g., to launch a boot-up routine and other instructions). Cloud-based storage may be used to supplement storage 1208 or instead of storage 1208.

Control circuitry 1204 may include video generating circuitry and tuning circuitry, such as one or more analog tuners, one or more MPEG-2 (or any other suitable codec) decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 1204 may also include scaler circuitry for upconverting and downconverting content into the preferred output format of user device 1200. Control circuitry 1204 may also include digital-to-analog converter circuitry and analog-to-digital converter circuitry for converting between digital and analog signals. The tuning and encoding circuitry may be used by user device 1200, 1201 to receive and to display, to play, or to record content. The tuning and encoding circuitry may also be used to receive media consumption data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 1208 is provided as a separate device from user device 1200, the tuning and encoding circuitry (including multiple tuners) may be associated with storage 1208.

Control circuitry 1204 may receive instruction from a user by way of user input interface 1210. User input interface 1210 may be any suitable user interface, such as a remote control, mouse, trackball, keypad, keyboard, touch screen, touchpad, stylus input, joystick, voice recognition interface, or other user input interfaces. Display 1212 may be provided as a stand-alone device or integrated with other elements of each one of user device 1200 and user device 1201. For example, display 1212 may be a touchscreen or touch-sensitive display. In such circumstances, user input interface 1210 may be integrated with or combined with display 1212. In some embodiments, user input interface 1210 includes a remote-control device having one or more microphones, buttons, keypads, any other components configured to receive user input or combinations thereof. For example, user input interface 1210 may include a handheld remote-control device having an alphanumeric keypad and option buttons. In a further example, user input interface 1210 may include a handheld remote-control device having a microphone and control circuitry configured to receive and identify voice commands and transmit information to set-top box 1215.

Audio output equipment 1214 may be integrated with or combined with display 1212. Display 1212 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 1212. Audio output equipment 1214 may be provided as integrated with other elements of each one of device 1200 and device 1201 or may be stand-alone units. An audio component of videos and other content displayed on display 1212 may be played through speakers (or headphones) of audio output equipment 1214. In some embodiments, audio may be distributed to a receiver (not shown), which processes and outputs the audio via speakers of audio output equipment

1214. In some embodiments, for example, control circuitry 1204 is configured to provide audio cues to a user, or other audio feedback to a user, using speakers of audio output equipment 1214. There may be a separate microphone 1216 or audio output equipment 1214 may include a microphone configured to receive audio input such as voice commands or speech. For example, a user may speak letters or words that are received by the microphone and converted to text by control circuitry 1204. In a further example, a user may voice commands that are received by a microphone and recognized by control circuitry 1204. Camera 1218 may be any suitable video camera integrated with the equipment or externally connected. Camera 1218 may be a digital camera comprising a charge-coupled device (CCD) and/or a complementary metal-oxide semiconductor (CMOS) image sensor. Camera 1218 may be an analog camera that converts to digital images via a video card.

The SDR system may be implemented using any suitable architecture. For example, it may be a stand-alone application wholly-implemented on each one of user device 1200 and user device 1201. In such an approach, instructions of the application may be stored locally (e.g., in storage 1208), and data for use by the application is downloaded on a periodic basis (e.g., from an out-of-band feed, from an Internet resource, or using another suitable approach). Control circuitry 1204 may retrieve instructions of the application from storage 1208 and process the instructions to provide media consumption and social network interaction functionality and generate any of the displays discussed herein. Based on the processed instructions, control circuitry 1204 may determine what action to perform when input is received from user input interface 1210. For example, movement of a cursor on a display up/down may be indicated by the processed instructions when user input interface 1210 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 1204 may allow a user to provide user profile information or may automatically compile user profile information. For example, control circuitry 1204 may access and monitor network data, video data, audio data, processing data, participation data from an SDR system and social network profile. Control circuitry 1204 may obtain all or part of other user profiles that are related to a particular user (e.g., via social media networks), and/or obtain information about the user from other sources that control circuitry 1204 may access. As a result, a user can be provided with a unified experience across the user's different devices.

In some embodiments, the SDR system is or may comprise one or more of a client/server-based application. Data for use by a thick or thin client implemented on each one of user device 1200 and user device 1201 may be retrieved on-demand by issuing requests to a server remote to each one of user device 1200 and user device 1201. For example, the remote server may store the instructions for the application in a storage device. The remote server may process the stored instructions using circuitry (e.g., control circuitry 1204) and generate the displays discussed above and below. The client device may receive the displays generated by the remote server and may display the content of the displays locally on device 1200. This way, the processing of the instructions is performed remotely by the server while the resulting displays (e.g., that may include text, a keyboard, or other visuals) are provided locally on device 1200. Device 1200 may receive inputs from the user via input interface 1210 and transmit those inputs to the remote server for processing and generating the corresponding displays. For example, device 1200 may transmit a communication to the remote server indicating that an up/down button was selected via input interface 1210. The remote server may process instructions in accordance with that input and generate a display of the application corresponding to the input (e.g., a display that moves a cursor up/down). The generated display may then be transmitted to device 1200 for presentation to the user.

In some embodiments, the SDR system (or applications thereof) may be downloaded and interpreted or otherwise run by an interpreter or virtual machine (run by control circuitry 1204). In some embodiments, the SDR system may be encoded in the ETV Binary Interchange Format (EBIF), received by control circuitry 1204 as part of a suitable feed, and interpreted by a user agent running on control circuitry 1204. For example, the SDR system may be an EBIF application. In some embodiments, the SDR system may be defined by a series of JAVA-based files that are received and run by a local virtual machine or other suitable middleware executed by control circuitry 1204. In some of such embodiments (e.g., those employing MPEG-2 or other digital media encoding schemes), the SDR system may be, for example, encoded and transmitted in an MPEG-2 (or any other suitable codec) object carousel with the MPEG (or any other suitable codec) audio and video packets of a program.

FIG. 13 is a diagram of an illustrative system 1300, in accordance with some embodiments of this disclosure. User devices 1307, 1308, 1310 (which may correspond to XR device 105 and/or 106 of FIG. 1, or any other suitable device, or any combination thereof) may be coupled to communication network 1306. Communication network 1306 may be one or more networks including the Internet, a mobile phone network, mobile voice or data network (e.g., a 5G, 4G, or LTE network, or any other suitable network or any combination thereof), cable network, public switched telephone network, short-range communication networks, or other types of communication networks or combinations of communication networks. In some embodiments, communication network 1306 may correspond to network 120 of FIG. 1, network 524 of FIG. 5, and networks 721, 724 and 734 of FIG. 7.

Paths (e.g., depicted as arrows connecting the respective devices to the communication network 1306) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 13 to avoid overcomplicating the drawing.

Although communications paths are not drawn between user devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user devices may also communicate with each other directly through an indirect path via communication network 1306.

System 1300 may comprise media content source 1302 and one or more servers 1304, and one or more social network services. In some embodiments, the SDR system (and/or applications provided by the SDR system) may be executed at least in part at one or more of control circuitry 1311 of server 1304 (and/or control circuitry of user devices 1307, 1308, 1310). In some embodiments, computing device 118 may correspond to server 1304 or user devices 1307, 1308, or 1310). In some embodiments, media content source 1302 and/or servers 1304 may store content used for generating XR environment 101 and other suitable XR environments, and user profile information of user's having participated in XR sessions.

In some embodiments, server 1304 may include control circuitry 1311 and storage 1314 (e.g., RAM, ROM, Hard Disk, Removable Disk, etc.). Storage 1314 may store one or more databases. Server 1304 may also include an input/output path 1312. I/O path 1312 may provide media consumption data, social networking data, device information, or other data, over a local area network (LAN) or wide area network (WAN), and/or other content and data to control circuitry 1311, which may include processing circuitry, and storage 1314. Control circuitry 1311 may be used to send and receive commands, requests, and other suitable data using I/O path 1312, which may comprise I/O circuitry. I/O path 1312 may connect control circuitry 1311 (and specifically control circuitry) to one or more communications paths. I/O path 1312 may comprise I/O circuitry.

Control circuitry 1311 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 1311 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 1311 executes instructions for an emulation system application stored in memory (e.g., the storage 1314). Memory may be an electronic storage device provided as storage 1314 that is part of control circuitry 1311.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method comprising:
generating for display, at an extended reality (XR) device executing an application, an XR environment comprising an entity, wherein the XR environment is associated with an XR session of a user profile, and the executing of the application enables the XR device, while generating for display the XR environment, to:
transmit data to, and receive data from, a particular device using a first communication protocol of a plurality of communication protocols; and
transmit data to, and receive data from, the entity using a second communication protocol of the plurality of communication protocols; and
based on monitoring activity associated with the user profile during the XR session, determining to enable the XR device to:
transmit data, received at the XR device from the entity using the second communication protocol, to the particular device using the first communication protocol; and
transmit data, received at the XR device from the particular device using the first communication protocol, to the entity using the second communication protocol.

2. The method of claim 1, wherein monitoring the activity associated with the user profile during the XR session comprises:
determining that the XR device is proximate to the entity in the XR environment, while the XR device is transmitting data to, or receiving data from, the particular device using the first communication protocol.

3. The method of claim 2, wherein:
the XR environment is a virtual reality (VR) environment associated with a physical environment in which the XR device is located;
the entity generated for display in the VR environment is a virtual object corresponding to a real-world object in the physical environment; and
determining that the XR device is proximate to the entity in the XR environment comprises determining that the XR device is proximate to the virtual object.

4. The method of claim 2, wherein:
the XR environment is an augmented reality (AR) environment associated with a physical environment in which the XR device is located;
the entity generated for display in the AR environment corresponds to a real-world object in the physical environment; and
determining that the XR device is proximate to the entity in the XR environment comprises determining that the XR device is proximate to the real-world object.

5. The method of claim 4, wherein determining that the XR device is proximate to the real-world object is based on performing processing of images of the real-world object captured by the XR device.

6. The method of claim 1, wherein the XR environment is a virtual reality (VR) environment, and the method further comprises:
generating for display in the VR environment a first virtual representation associated with the user profile; and
generating for display in the VR environment a second virtual representation associated with the particular device;
wherein monitoring the activity associated with the user profile during the XR session comprises determining that the first virtual representation is proximate to the second virtual representation.

7. The method of claim 1, further comprising:
generating for display, in the XR environment, a notification regarding whether the particular device should be granted permission to transmit data to, and receive data from, the entity via the XR device;
wherein monitoring the activity associated with the user profile during the XR session comprises receiving an affirmative selection, from the user profile, to grant permission to the particular device to transmit data to, and receive data from, the entity via the XR device.

8. The method of claim 1, further comprising:
generating for display indications of the plurality of communication protocols;
receiving selection of one of the indications; and
creating an ad hoc network based on a communication protocol corresponding to the selected indication.

9. The method of claim 1, wherein:
the entity corresponds to a real-world object in a physical environment corresponding to the XR environment;
the particular device is associated with a manufacturer of the object and is located remote from the physical environment comprising the object; and
the data, received at the XR device from the entity using the second communication protocol and transmitted to the particular device using the first communication protocol, is diagnostic data associated with the entity.

10. The method of claim 9, wherein the data, received at the XR device from the particular device using the first communication protocol and transmitted to the entity using the second communication protocol, is used to configure the entity based on the diagnostic data.

11. A computer-implemented system comprising:
memory;
control circuitry configured to:
generate for display, at an extended reality (XR) device executing an application stored in the memory, an XR environment comprising an entity, wherein the XR environment is associated with an XR session of a user profile, and the executing of the application enables the XR device, while generating for display the XR environment, to:
transmit data to, and receive data from, a particular device using a first communication protocol of a plurality of communication protocols; and
transmit data to, and receive data from, the entity using a second communication protocol of the plurality of communication protocols; and
based on monitoring activity associated with the user profile during the XR session, determine to enable the XR device to:
transmit data, received at the XR device from the entity using the second communication protocol, to the particular device using the first communication protocol; and
transmit data, received at the XR device from the particular device using the first communication protocol, to the entity using the second communication protocol.

12. The system of claim 11, wherein the control circuitry is configured to monitor the activity associated with the user profile during the XR session by:
determining that the XR device is proximate to the entity in the XR environment, while the XR device is transmitting data to, or receiving data from, the particular device using the first communication protocol.

13. The system of claim 12, wherein:
the XR environment is a virtual reality (VR) environment associated with a physical environment in which the XR device is located;
the entity generated for display in the VR environment is a virtual object corresponding to a real-world object in the physical environment; and
the control circuitry is configured to determine that the XR device is proximate to the entity in the XR environment by determining that the XR device is proximate to the virtual object.

14. The system of claim 12, wherein:
the XR environment is an augmented reality (AR) environment associated with a physical environment in which the XR device is located;
the entity generated for display in the AR environment corresponds to a real-world object in the physical environment; and
the control circuitry is configured to determine that the XR device is proximate to the entity in the XR environment by determining that the XR device is proximate to the real-world object.

15. The system of claim 14, wherein the control circuitry is configured to determine that the XR device is proximate to the real-world object based on performing processing of images of the real-world object captured by the XR device.

16. The system of claim 11, wherein the XR environment is a virtual reality (VR) environment, and the control circuitry is further configured to:
generate for display in the VR environment a first virtual representation associated with the user profile; and
generate for display in the VR environment a second virtual representation associated with the particular device;
monitor the activity associated with the user profile during the XR session by determining that the first virtual representation is proximate to the second virtual representation.

17. The system of claim 11, wherein the control circuitry is further configured to:
generate for display, in the XR environment, a notification regarding whether the particular device should be granted permission to transmit data to, and receive data from, the entity via the XR device;
monitor the activity associated with the user profile during the XR session by receiving an affirmative selection, from the user profile, to grant permission to the particular device to transmit data to, and receive data from, the entity via the XR device.

18. The system of claim 11, wherein the control circuitry is further configured to:
generate for display indications of the plurality of communication protocols;
receive selection of one of the indications; and
create an ad hoc network based on a communication protocol corresponding to the selected indication.

19. The system of claim 11, wherein:
the entity corresponds to a real-world object in a physical environment corresponding to the XR environment;
the particular device is associated with a manufacturer of the object and is located remote from the physical environment comprising the object; and
the data, received at the XR device from the entity using the second communication protocol and transmitted to the particular device using the first communication protocol, is diagnostic data associated with the entity.

20. The system of claim 19, wherein the data, received at the XR device from the particular device using the first communication protocol and transmitted to the entity using the second communication protocol, is used to configure the entity based on the diagnostic data.

\* \* \* \* \*